US011195161B2

(12) United States Patent
Gotanda

(10) Patent No.: US 11,195,161 B2
(45) Date of Patent: Dec. 7, 2021

(54) CHECKOUT SYSTEM

(71) Applicant: TOSHIBA TEC KABUSHIKI KAISHA, Tokyo (JP)

(72) Inventor: Tsuyoshi Gotanda, Ota Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 131 days.

(21) Appl. No.: 16/540,176

(22) Filed: Aug. 14, 2019

(65) Prior Publication Data
US 2019/0370771 A1 Dec. 5, 2019

Related U.S. Application Data

(62) Division of application No. 15/602,163, filed on May 23, 2017, now abandoned.

(30) Foreign Application Priority Data

May 23, 2016 (JP) ................. 2016-102574

(51) Int. Cl.
G06Q 20/20 (2012.01)
G07G 1/14 (2006.01)
G06Q 20/28 (2012.01)
G07G 1/00 (2006.01)
G07G 5/00 (2006.01)

(52) U.S. Cl.
CPC ......... *G06Q 20/204* (2013.01); *G06Q 20/202* (2013.01); *G06Q 20/208* (2013.01); *G06Q 20/209* (2013.01); *G06Q 20/28* (2013.01); *G07G 1/0072* (2013.01); *G07G 1/14* (2013.01); *G07G 5/00* (2013.01)

(58) Field of Classification Search
CPC .. G06Q 20/204; G06Q 20/202; G06Q 20/208; G06Q 20/209
See application file for complete search history.

(56) References Cited

U.S. PATENT DOCUMENTS 6,687,340 B1 2/2004 Goldberg et al.
9,721,243 B2 * 8/2017 Itwaru ................ G06Q 20/3276
(Continued)

FOREIGN PATENT DOCUMENTS

EP 3001391 3/2016
JP 2004-038710 2/2004
JP 2016-071523 5/2016

OTHER PUBLICATIONS

Final Office Action for U.S. Appl. No. 15/602,163 dated Feb. 18, 2020.
(Continued)

*Primary Examiner* — Nanel Frenel
(74) *Attorney, Agent, or Firm* — Amin, Turocy & Watson, LLP

(57) ABSTRACT

A registration apparatus stores input data. The registration apparatus outputs the stored data. A checkout apparatus receives an input relating to payment for a commodity before data input of all commodities purchased by a customer at the registration apparatus is terminated. The checkout apparatus stores data relating to the received input. The checkout apparatus generates transaction data indicating a content of one transaction based on the stored data and the data output from the registration apparatus and issues a receipt.

9 Claims, 13 Drawing Sheets

(56) References Cited

U.S. PATENT DOCUMENTS

| | | |
|---|---|---|
| 10,755,240 B2 | 8/2020 | El-Balah |
| 10,846,782 B2* | 11/2020 | Atikoglu ............ G06Q 30/0635 |
| 2004/0138911 A1 | 7/2004 | Oshima et al. |
| 2007/0257110 A1* | 11/2007 | Schmidt ............... G07G 1/0045 235/383 |
| 2007/0290043 A1* | 12/2007 | Russell .............. G06K 7/10584 235/462.14 |
| 2013/0204697 A1* | 8/2013 | Boal ...................... G06Q 30/02 705/14.51 |
| 2015/0193771 A1 | 7/2015 | Pisarenko |
| 2015/0213425 A1 | 7/2015 | Namura et al. |
| 2016/0005132 A1* | 1/2016 | Freeman ................ G06Q 20/32 705/30 |
| 2016/0050327 A1 | 2/2016 | Yokoyama |
| 2017/0262833 A1* | 9/2017 | Xing ...................... G06Q 20/10 |
| 2018/0165659 A1 | 6/2018 | El-Balah |
| 2019/0244192 A1 | 8/2019 | Katzin et al. |

OTHER PUBLICATIONS

Japanese Office Action for Japanese Patent Application No. 2016-102574 dated Apr. 14, 2020.
Extended European Search Report for European Patent Application No. 17171866.1 dated Sep. 6, 2017.
U.S. Appl. No. 15/602,163, filed May 23, 2017.
U.S. Appl. No. 16/540,172, filed Aug. 14, 2019.
Non-Final Office Action for U.S. Appl. No. 15/602,163 dated Aug. 15, 2019.
Non-Final Office Action for U.S. Appl. No. 16/540,172 dated Mar. 15, 2021.

* cited by examiner

| REGISTRATION APPARATUS ID | CHECKOUT APPARATUS ID | | | | | |
|---|---|---|---|---|---|---|
| | FIRST PLACE | SECOND PLACE | THIRD PLACE | FOURTH PLACE | FIFTH PLACE | SIXTH PLACE |
| R1 | A2 | A1 | A3 | A4 | A5 | A6 |
| R2 | A4 | A3 | A5 | A6 | A1 | A2 |
| R3 | A6 | A5 | A4 | A3 | A2 | A1 |

FIG.11

| | COMMODITY NAME | NUMBER | UNIT PRICE | AMOUNT |
|---|---|---|---|---|
| 1 | | | | |

TOTAL

FIG.12

R1 REGISTRATION | A1 PLEASE GUIDE CUSTOMER TO

| | COMMODITY NAME | NUMBER | UNIT PRICE | AMOUNT |
|---|---|---|---|---|
| 1 | | | | |

TOTAL

CHECKOUT SYSTEM

CROSS-REFERENCE TO RELATED APPLICATIONS

This application is a Divisional of application Ser. No. 15/602,163 filed on May 23, 2017, the entire contents of which are incorporated herein by reference.

This application is based upon and claims the benefit of priority from Japanese Patent Application No. 2016-102574, filed May 23, 2016, the entire contents of which are incorporated herein by reference.

FIELD

Embodiments described herein relate generally to a checkout system, a checkout method, and an in-store transaction network.

BACKGROUND

There is known a semi-self-type checkout system as a checkout system for a retail store. The semi-self-type checkout system contains a registration apparatus for inputting data of a commodity to be purchased by a customer, in other words, a so-called purchase target commodity and a checkout apparatus for processing payment of the purchase target commodity based on the data input by the registration apparatus. A store clerk mainly operates the registration apparatus, and the customer mainly operates the checkout apparatus.

In a case of the semi-self-type checkout system, the customer carries the purchase target commodity to a checkout region. There is a store clerk in the checkout region, and the store clerk operates the registration apparatus to input the data of the purchase target commodity. The customer waits for until the data input is terminated. If the data input is terminated and the store clerk instructs movement to the checkout apparatus, the customer moves to an installation position of the instructed checkout apparatus and operates the checkout apparatus to execute the payment.

In this way, the customer stands by near the registration apparatus until the data input of the purchase target commodity is finished, and after the data input is terminated, the customer moves to the installation position of the checkout apparatus to start preparation for payment. In other words, as the customer starts the preparation for payment after the data input of the purchase target commodity is completed and the customer moves to the installation position of the checkout apparatus, waiting time until the data input is completed is wasteful.

DESCRIPTION OF THE DRAWINGS

FIG. 3 is a pattern view illustrating the data structure of a selection table;

FIG. 11 is a diagram illustrating an example of a registration image displayed on a touch panel of the registration apparatus;

FIG. 12 is a diagram illustrating an example of a link destination image displayed in the registration image in FIG. 11;

DETAILED DESCRIPTION

In accordance with an embodiment, a checkout system includes a registration apparatus for inputting data of a commodity purchased by a customer and a plurality of checkout apparatuses for processing payment of the commodity based on the data input in the registration apparatus. The registration apparatus includes a registration side storage module and an output module. The checkout apparatus includes a payment reception module, a checkout side storage module, a generation module and an issuance module.

The registration side storage module stores input data. The output module outputs the data stored by the registration side storage module. The payment reception module receives an input relating to payment for a commodity before data input of all commodities purchased by a customer at the registration apparatus is terminated. The checkout side storage module stores data relating to the input received by the payment reception module. The generation module generates transaction data indicating a content of one transaction based on the data stored in the checkout side storage module and the data output by the output module. The issuance module issues a receipt of the one transaction based on the transaction data generated by the generation module.

Hereinafter, an embodiment of a checkout system with which a customer can start preparation of payment at an installation position of a checkout apparatus without waiting for termination of data input of a purchase target commodity is described with reference to the accompanying drawings.

Figure 1:
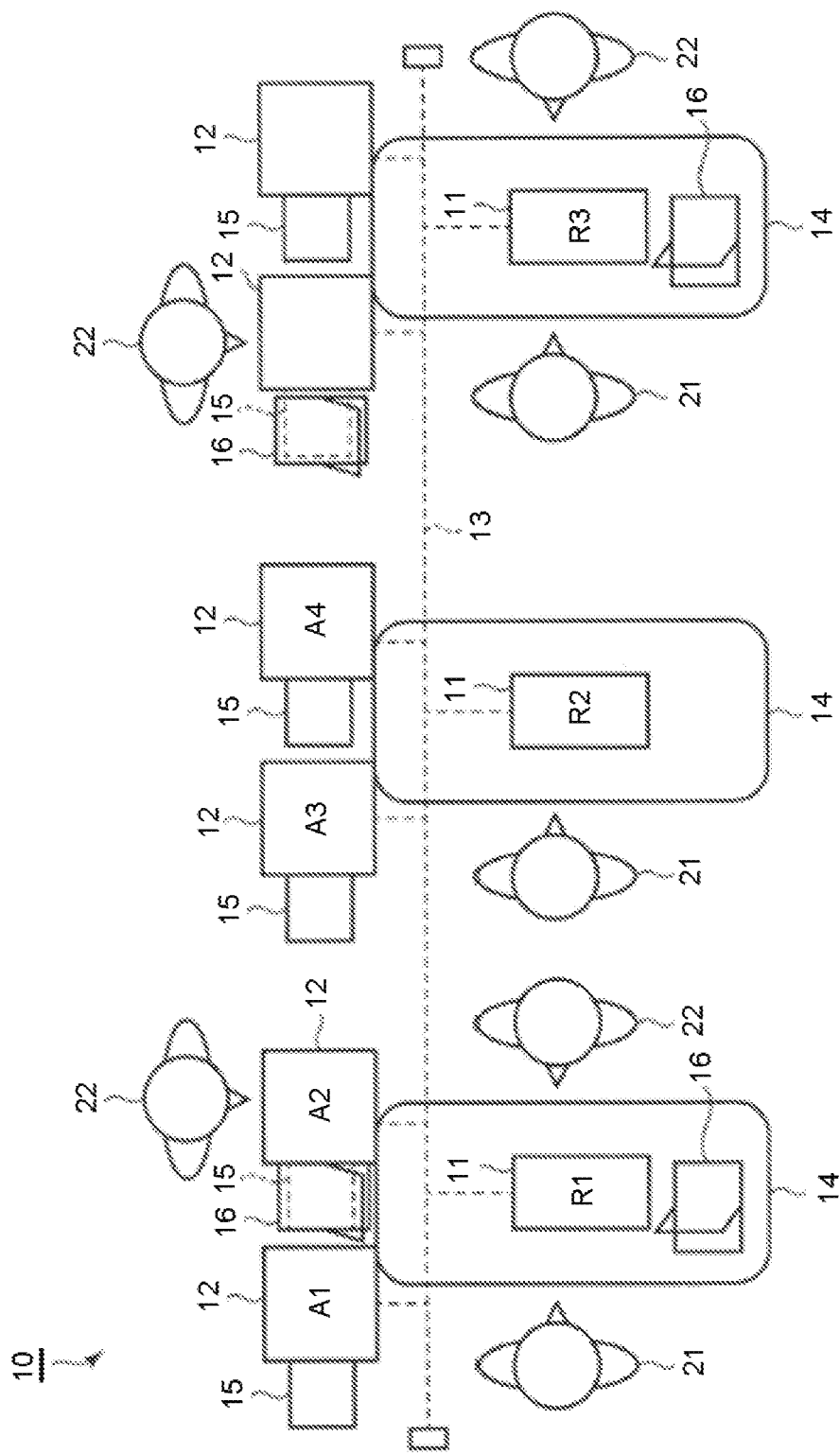
FIG. 1 is a pattern view illustrating a checkout system according to an embodiment.

FIG. 1 is a pattern view illustrating a checkout system 10 according to the present embodiment. The checkout system 10 includes a plurality of registration apparatuses 11 and checkout apparatuses 12. The registration apparatus 11 and the checkout apparatus 12 are arranged in each checkout lane of a retail store. The number of the registration apparatuses 11 and the number of the checkout apparatuses 12 arranged in one checkout lane are optional. The number of the checkout apparatuses 12 is more than that of the registration apparatuses 11. In the present embodiment, one registration apparatus 11 and two checkout apparatuses 12 are arranged in each of three checkout lanes.

The registration apparatus 11 and the checkout apparatus 12 in each checkout lane are connected to a LAN (local area network) 13 which is an in-store network. The registration apparatus 11 and the checkout apparatus 12 exchange information via a LAN 13. Although not shown in drawing, a server is connected to the LAN 13. The server stores a commodity database in which commodity information such as a commodity name and unit price is set in association with a commodity code of each commodity. The server may further store other databases. Another communication network such as the Internet or a wireless LAN may be used instead of the LAN 13 as the network. Information may be exchanged between the registration apparatus 11 and the checkout apparatus 12 via the server.

Unique device IDs are assigned to the registration apparatus 11 and the checkout apparatus 12, respectively. Depending on the device ID, the registration apparatus 11 and the checkout apparatus 12 are individually identified. In the present embodiment, a device ID "R1" is assigned to the registration apparatus 11 installed in the checkout lane on the left side as viewed from the front of FIG. 1. A device ID "R2" is assigned to the registration apparatus 11 installed in the checkout lane in the center. A device ID "R3" is assigned to the registration apparatus 11 installed in the checkout lane on the right side. Device IDs "A1" and "A2" are assigned to the two checkout apparatuses 12 installed in the checkout lane on the left side. Device IDs "A3" and "A4" are assigned to the two checkout apparatuses 12 arranged in the checkout lane in the center. Device IDs "A5" and "A6" are assigned to the two checkout apparatuses 12 arranged in the checkout lane on the right side.

The checkout system 10 is a semi-self-type. In other words, a store clerk 21 who plays a role of checker operates the registration apparatus 11. A customer 22 who intends to purchase the commodity operates the checkout apparatus 12. The registration apparatus 11 is installed on a counter 14. The counter 14 has a rectangular top plate. A plurality of counters 14 is arranged such that the longitudinal directions of the top plates thereof are substantially parallel to each other, whereby a passage (checkout lane) of the customer 22 is formed. In the present embodiment, after entering the passage from a sales floor side (lower side in FIG. 1) and placing a shopping basket 16 including a purchase target commodity on the counter 14, the customer 22 moves to an installation position of any one of the checkout apparatuses 12. The store clerk 21 instructs the customer to move to which installation position of the checkout apparatus 12. Information indicating which installation position of the checkout apparatus 12 the customer moves to is delivered to the customer by display or voice and the like, and the customer may voluntarily move to the installation position of the checkout apparatus 12.

The registration apparatus 11 has a function of registering the purchase target commodity and a function of creating registration transaction data. Registration of the purchase target commodity refers to that the registration apparatus 11 receives data input of the commodity that the customer 22 desires to purchase and registers the data in a memory. For example, if a barcode attached to the purchase target commodity is scanned by a scanner, the registration apparatus 11 registers data such as sales quantity and sales amount of the commodity. The registration transaction data refers to collection of data obtained by registering all the commodities that one customer desires to purchase. The registration transaction data includes a commodity code, a commodity name, unit price, sales quantity and sales amount for each purchase target commodity, total quantities and total amount of all purchase target commodities, and the like. The registration transaction data created by the registration apparatus 11 is transferred to any one of the checkout apparatuses 12.

The memory in which the data is registered is not necessarily a memory provided in the registration apparatus 11. The data may be registered in a memory of an external device connected to the registration apparatus 11.

In FIG. 1, two checkout apparatuses 12 are arranged side by side along a short side of each counter 14 at an opposite side to the sales floor side. Then, each checkout apparatus 12 is installed in such a manner that the customer 22 who operates the checkout apparatus 12 faces the retail store. On the right side of each checkout apparatus 12 as seen from the customer 22 operating the checkout apparatus 12, there is a table 15 for bagging. The commodity registered by the registration apparatus 11 and put in the shopping basket 16 is placed on the table 15 by the store clerk. The customer 22 operates the checkout apparatus 12 to pay for the commodity and bags the commodity.

How to arrange the registration apparatus 11 and the checkout apparatus 12 is arbitrary and is not limited to the arrangement shown in FIG. 1. The arrangement may be optional as long as a movement route that the customer 22 goes to the vicinity of the registration apparatus 11 to deposit the purchase target commodity to the store clerk 21, and then moves to the installation position of the checkout apparatus 12 to operate the checkout apparatus 12 is ensured.

The checkout apparatus 12 includes a function of receiving the registration transaction data transferred from the registration apparatus 11, a function of processing the payment for the purchase target commodity based on the registration transaction data and the like. There are various methods for paying for the commodity. In the present embodiment, the checkout apparatus 12 corresponds to payment with cash, electronic money and a credit card. The checkout apparatus 12 may correspond to other payment methods, for example, a cash voucher payment such as a gift certificate, payment with accumulated points, and the like.

Figure 2:
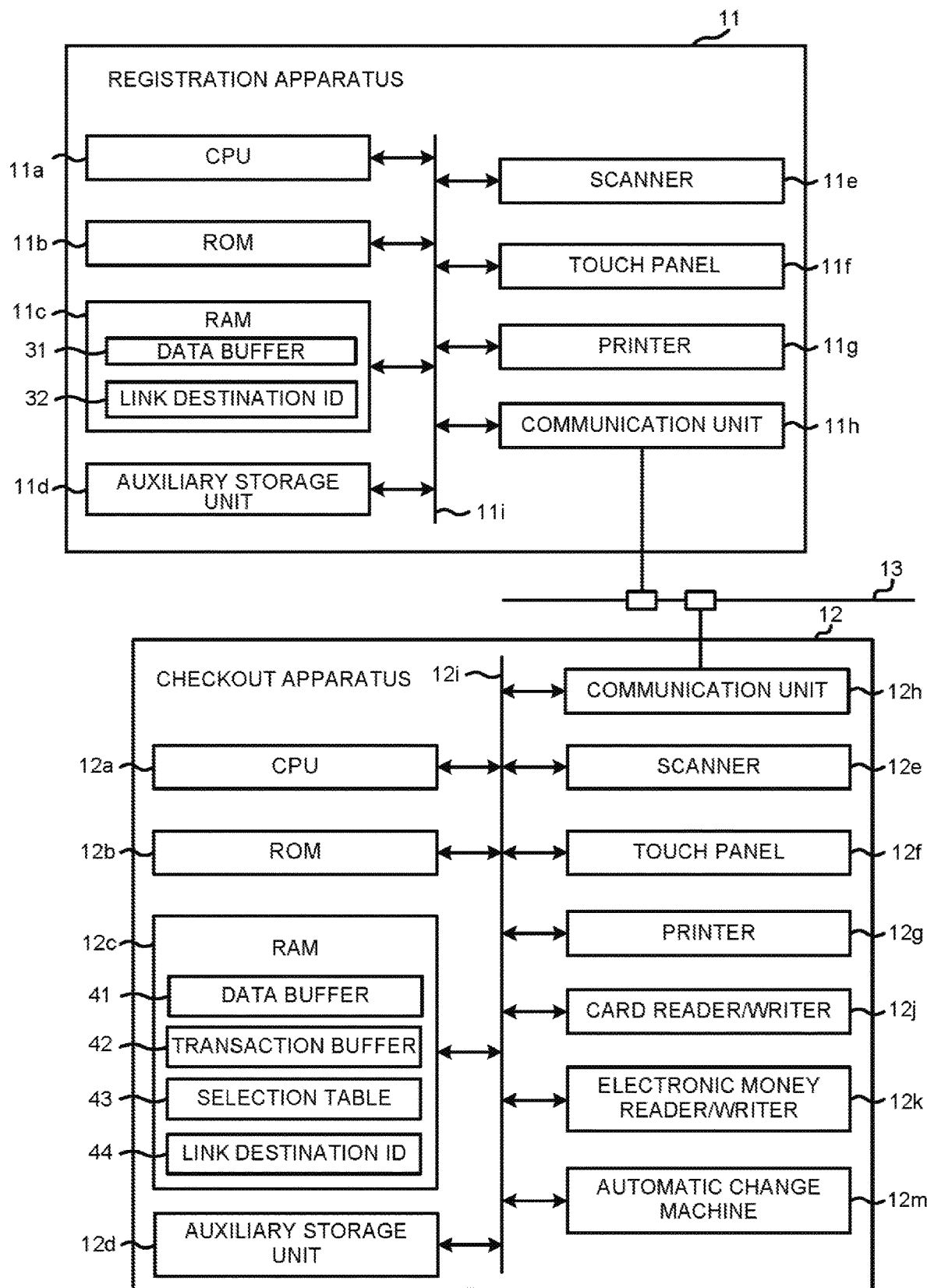
FIG. 2 is a block diagram illustrating the main circuit structures of a registration apparatus and a checkout apparatus.

FIG. 2 is a block diagram illustrating the main circuit structure of the registration apparatus 11 and the checkout apparatus 12. The registration apparatus 11 comprises a CPU (Central Processing Unit) 11$a$, a ROM (Read Only Memory) 11$b$, a RAM (Random Access Memory) 11$c$, an auxiliary storage unit 11$d$, a scanner 11$e$, a touch panel 11$f$, a printer 11$g$, a communication unit 11$h$ and a transmission system 11$i$.

The CPU 11$a$, the ROM 11$b$, the RAM 11$c$ and the auxiliary memory unit 11$d$ are connected with each other via the transmission system 11$i$ to constitute a computer. The CPU 11$a$ acts as a main unit of the computer. The CPU 11$a$ controls each section for realizing various functions of the registration apparatus 11 based on an operating system, middleware and application programs stored in the ROM 11$b$ and the RAM 11$c$.

The ROM 11$b$ acts as a main memory unit of the computer. The ROM 11$b$ stores the operating system. The ROM 11$b$ also stores the middleware or application programs in some cases. The ROM 11$b$ still also stores reference data required to execute various processing by the CPU 11$a$ in some cases.

The RAM 11$c$ acts as a main storage unit of the computer. The RAM 11$c$ also stores reference data required to execute various processing by the CPU 11$a$. Further, the RAM 11$c$ is used as a so-called working area in which data temporarily used by the CPU 11a for executing various processing is stored.

The auxiliary memory unit 11d acts as an auxiliary storage unit of the computer. The auxiliary memory unit 11d stores data used by the CPU 11a to execute various processing or data created through a processing carried out by the CPU 11a. The auxiliary memory unit 11d may be, for example, an EEPROM (electric erasable programmable read-only memory), an HDD (hard disk drive) or an SSD (solid state drive). Application programs stored in the ROM 11b or the auxiliary memory unit 11d include a control program written for an information processing executed by the registration apparatus 11.

The scanner 11e reads a barcode attached to the commodity to obtain the commodity code of the commodity. The touch panel 11f includes a display device and a touch sensor. The touch panel 11f is provided on the counter 14 in such a manner that a screen thereof faces a working space side of the store clerk 21. The printer 11g issues a receipt by printing various character strings or images on a receipt paper. The communication unit 11h is connected to the LAN 13. The communication unit 11h executes data communication with a plurality of the checkout apparatuses 12 connected via the LAN 13. The communication unit 11h can execute the data communication with another registration apparatus 11 via the LAN 13.

The transmission system 11i transmits data transmitted or received among the CPU 11a, the ROM 11b, the RAM 11c, the auxiliary memory unit 11d, the scanner 11e, the touch panel 11f, the printer 11g and the communication unit 11h. The transmission system 11i may be a known system which includes various buses such as a system bus and various interface circuits for connecting these buses with each section. Further, as the hardware of such a registration apparatus 11, for example, an existing POS terminal can be used.

The checkout apparatus 12 includes a CPU 12a, a ROM 12b, a RAM 12c, an auxiliary storage unit 12d, a scanner 12e, the touch panel 12f, a printer 12g, a communication unit 12h, a card reader/writer 12j, an electronic money reader/writer 12k, an automatic change machine 12m and a transmission system 12i.

The card reader/writer 12j has a function of reading data recorded in a card and a function of writing data to the card. The card includes a card for settlement such as a credit card or a debit card.

The electronic money reader/writer 12k has a function of reading data recorded in an electronic money medium and a function of writing data to the electronic money medium. The electronic money medium includes an IC card, a smartphone, and the like.

The automatic change machine 12m receives an inserted coin and bill. The automatic change machine 12m also discharges the coin and the bill as the change.

The CPU 12a, the ROM 12b, the RAM 12c, the auxiliary storage unit 12d, the scanner 12e, the touch panel 12f, the printer 12g, the communication unit 12h and the transmission system 12i have the same functions as those of the registration apparatus 11. In other words, the CPU 12a, the ROM 12b, the RAM 12c and the auxiliary memory unit 12d are connected with each other via the transmission system 12i to constitute a computer. The CPU 12a controls each section for realizing various operations of the settlement apparatus 12 according to an operating system, middleware and application programs stored in the ROM 12b and the RAM 12c. Application programs stored in the ROM 12b or the auxiliary memory unit 12d include a control program written for an information processing executed by the checkout apparatus 12. As the hardware of such a settlement apparatus 12, for example, a known self-checkout POS terminal can be used.

The checkout system 10 including the registration apparatus 11 and the checkout apparatus 12 having such a constitution has the following functions A-H.

Function A: A function (registration side storage module) of storing the input data by the registration apparatus 11.

Function B: A function (output module) of outputting the data stored by the registration side module to the checkout apparatus 12 by the registration apparatus 11.

Function C: A function (payment reception module) of receiving the input relating to the payment for the commodity by the checkout apparatus 12 before the data input of all the commodities purchased by the customer at the registration apparatus 11 is terminated.

Function D: A function (checkout side storage module) of storing the data received by the payment reception module by the checkout apparatus 12.

Function E: A function (generation module) of generating the transaction data indicating the content of one transaction from the data stored by the checkout side storage module and the data output by the output module.

Function F: A function (issuance module) of issuing the receipt of one transaction based on the transaction data generated by the generation module by the checkout apparatus 12.

Function G: Before data input of the commodity purchased by the customer at the registration apparatus 11 is started or during a period from the start to the termination of the data input, a function (link module) of setting the registration apparatus 11 to a linked state in which the registration apparatus 11 is capable of executing the data communication with any one of the plurality of the checkout apparatuses 12.

In order to realize the above functions A-H, the checkout system 10 forms a data buffer 31 and a link destination ID memory 32 in the RAM 11c of the registration apparatus 11 and forms a data buffer 41, a transaction buffer 42, a selection table memory 43 and a link destination ID memory 44 in the RAM 12c of the checkout apparatus 12.

The data buffer 31 at the registration apparatus 11 side is used to store commodity codes, commodity names, unit prices, sales quantities and sales amount of all the purchase target commodities for one customer, in other words, all the purchase target commodities registered as one transaction. The commodity code is a unique code for identifying each commodity individually. For example, a commodity code represented by a barcode is attached to each commodity, and by scanning the barcode with the scanner 11e, the registration apparatus 11 can acquire the commodity code. The commodity name and the unit price are a name and a unit price of the commodity identified by the corresponding commodity code.

The link destination ID memory 32 is an area for storing the device ID of the checkout apparatus 12 in a linked state with the registration apparatus 11.

The data buffer 41 on the checkout apparatus 12 side is used to store payment transaction data relating to the payment for the purchase target commodity which is registered as one transaction. For example, in the case of cash payment, the payment transaction data includes deposit amount, payment amount, change amount and the like. In the case of electronic money payment, the payment transaction data includes payment amount, balance after payment, and the like. In the case of credit card payment, the payment transaction data includes card information, payment amount and the like.

The transaction buffer 42 stores transaction data generated from registration transaction data transmitted from the registration apparatus 11 and the payment transaction data in the data buffer 41.

The selection table memory 43 stores a selection table T1 having the data structure shown in FIG. 3. The selection table T1 sets the device ID (checkout apparatus ID) of each checkout apparatus 12 in the descending order of the priority order in association with the device ID (registration apparatus ID) of each registration apparatus 11. The priority order is a descending order of a distance from the registration apparatus 11. However, the same checkout apparatus 12 is adjusted so as not to be in the same rank for different registration apparatuses 11.

In the present embodiment, in FIG. 1, the checkout apparatuses 12 with the device IDs "A2", "A1", "A3", "A4", "A5" and "A6" are set in order of priority from 1st to 6th for the registration apparatus 11 with the device ID "R2". For the registration apparatus 11 with the device ID "R2", the checkout apparatuses 12 with the device IDs "A4", "A3", "A5", "A6", "A2" and "A2" are set in order of priority from 1st to 6th. For the registration apparatus 11 with the device ID "R3", the checkout apparatuses 12 with the device IDs "A6", "A5", "A4", "A3", "A2" and "A2" are set in order of priority from 1st to 6th.

The link destination ID memory 44 is used to store the device ID of the registration apparatus 11 in the linked state with the checkout apparatus 12.

The checkout system 10 implements control programs for realizing the functions A-H in one transaction respectively in the registration apparatus 11 and the checkout apparatus 12.

Figure 4:
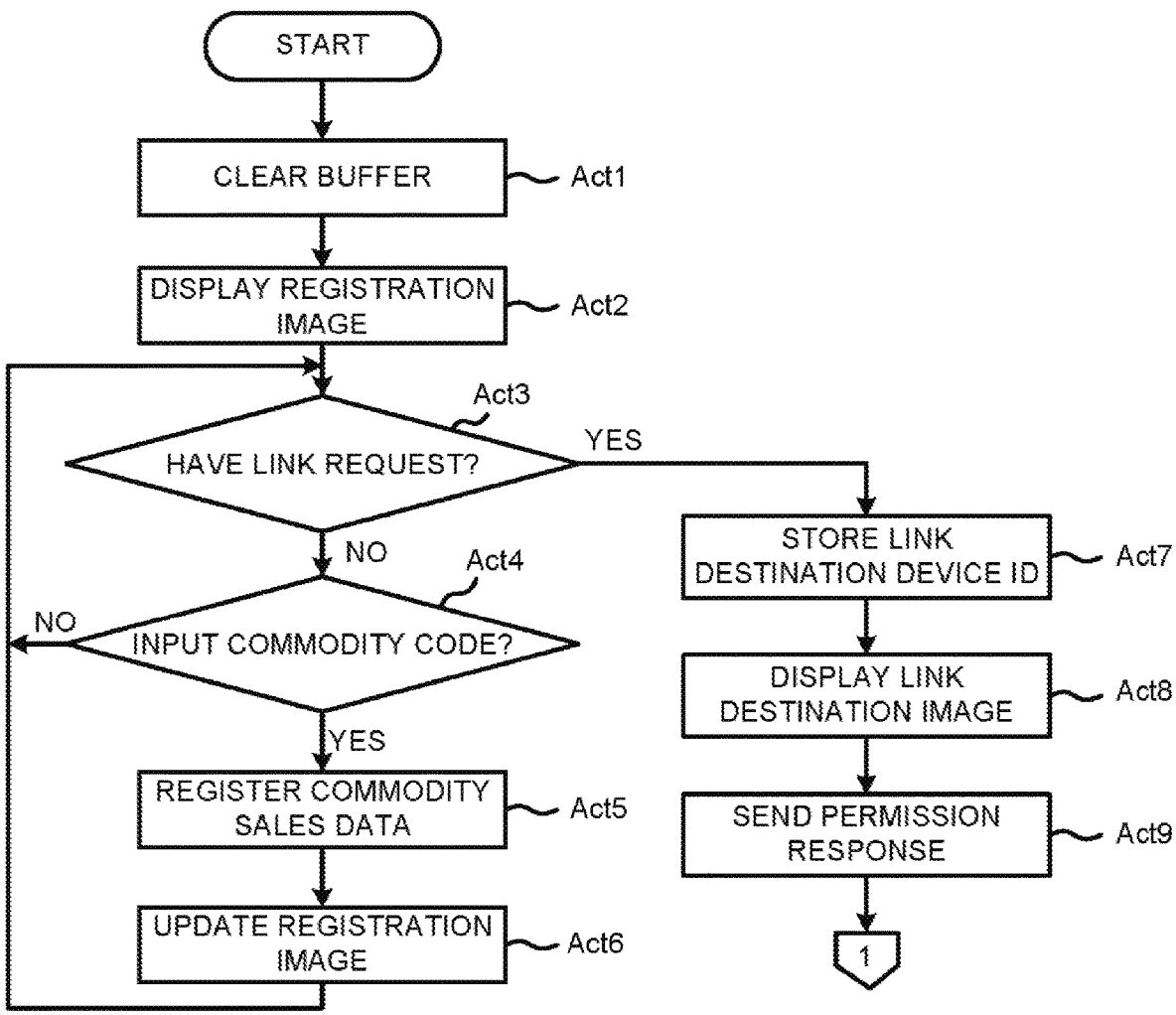
FIG. 4 is a flowchart illustrating an information processing procedure of one transaction executed by a CPU of the registration apparatus according to a control program.
Figure 5:
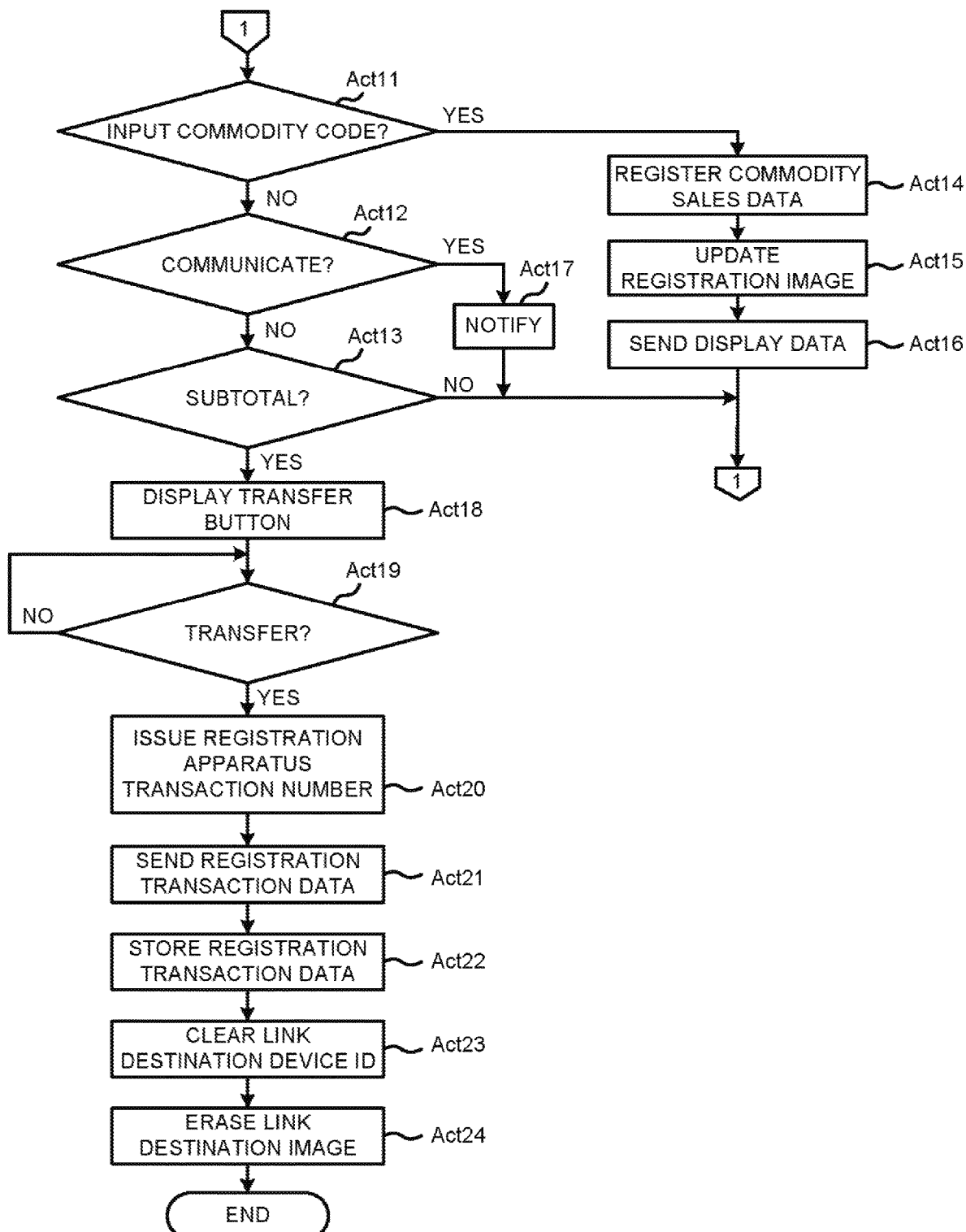
FIG. 5 is a flowchart illustrating an information processing procedure of one transaction executed by the CPU of the registration apparatus according to the control program.
Figure 13:
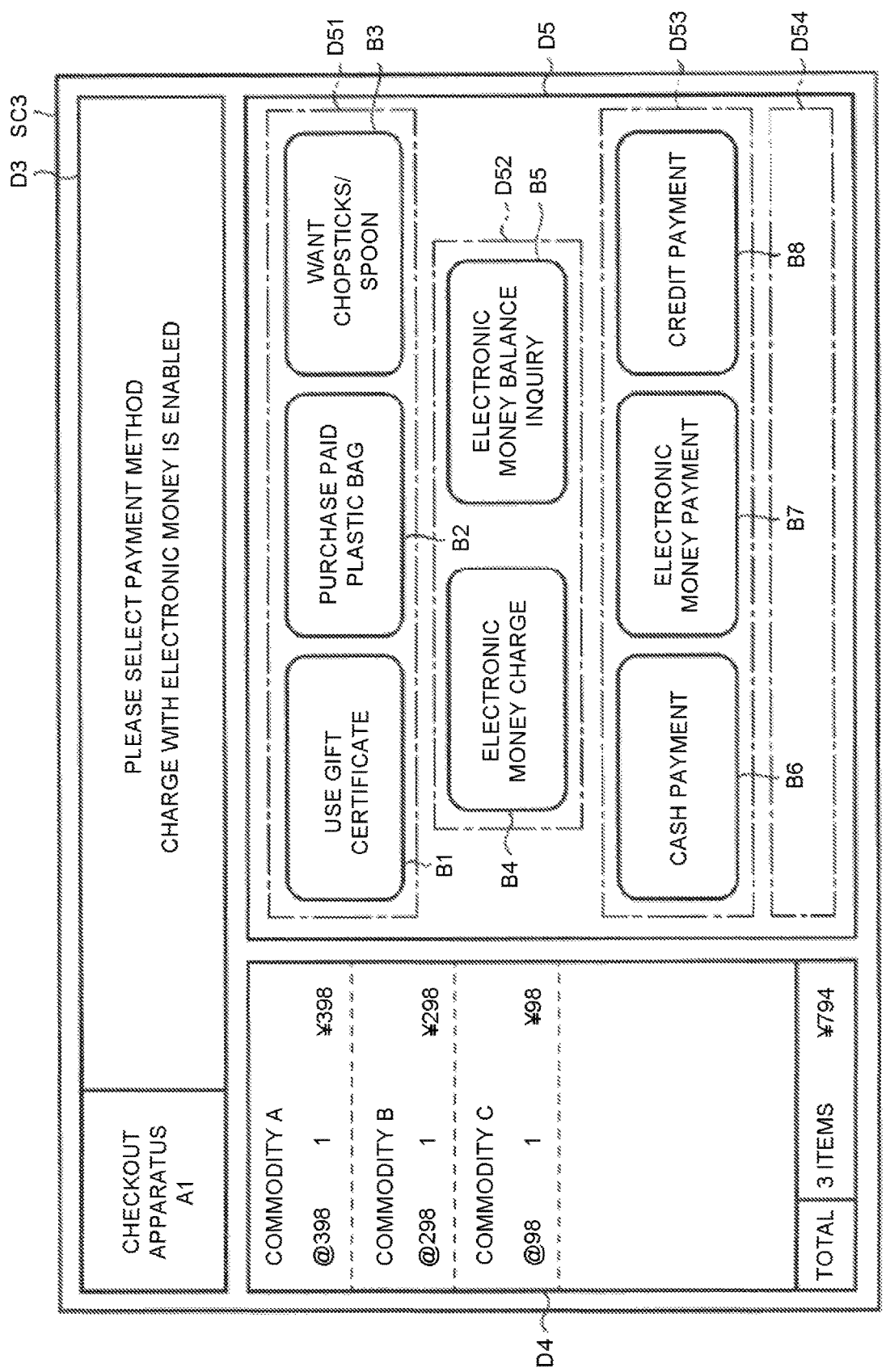
FIG. 13 is a diagram illustrating an example of a checkout preparation image displayed on the touch panel of the checkout apparatus.

FIG. 4 and FIG. 5 are flowcharts illustrating the information processing procedure in one transaction executed according to the control program by the CPU 11a of the registration apparatus 11. FIG. 6 to FIG. 10 are flowcharts illustrating the information processing procedure in one transaction executed according to the control program by the CPU 12a of the checkout apparatus 12. FIG. 11 and FIG. 12 are pattern views illustrating examples of an image displayed on the touch panel 11f of the registration apparatus 11. FIG. 13 is a pattern view illustrating an image displayed on the touch panel 12f of the checkout apparatus 12. Hereinafter, with reference to these drawings, the information processing executed to one transaction by the registration apparatus 11 and the checkout apparatus 12 is described. Furthermore, the content of the information processing described below is merely an example, and various information processing that can obtain the same result can be properly used.

First, the information processing executed by the registration apparatus 11 is described with reference to FIG. 4 and FIG. 5. The information processing is executed according to the control program stored in the ROM 11b or the auxiliary storage unit 11d.

If the control program is started in the registration apparatus 11, as shown in FIG. 4, the CPU 11a clears the data buffer 31 (Act 1). The CPU 11a displays a registration image SC1 (refer to FIG. 11) on a part of a screen of the touch panel 11f (Act 2).

The registration image SC1 shows the content of the data buffer 31 and enables the store clerk 21 to confirm an execution condition of a registration processing for one transaction. As shown in FIG. 11, the registration image SC1 includes display areas D1 and D2. The display area D1 displays the commodity name, the unit price, the sales quantity (number) and the sales amount of the purchase target commodity that is most recently registered in the data buffer 31. The display area D1 also displays the total quantities and the total amount of all the registered purchase target commodities. The display area D2 displays the commodity name, the unit price, the sales quantity (number) and the sales amount of the purchase target commodity registered in the data buffer 31 in a format of list prior to the commodity indicated in the display area D1. By the way, at the time of the processing in Act 2, since the data is not registered in the data buffer 31, the data is not displayed in the display areas D1 and D2.

Although omitted in the drawing, various functional buttons such as a commodity button for the store clerk 21 to designate the commodity and a subtotal button for designate registration termination of the purchase target commodity registered in one transaction are displayed in an area other than an area of the registration image SC1 on the screen of the touch panel 11f.

If the registration image SC1 is displayed, the CPU 11a confirms whether or not a link request command is received from anyone of the checkout apparatuses 12 (Act 3). The link request command is described in the information processing by the checkout apparatus 12 described later. If the link request command is not received (NO in Act 3), the CPU 11a confirms whether or not the commodity code is input (Act 4). The commodity code is input via the scanner 11e or the touch panel 11f. If the commodity code is not input (NO in Act 4), the CPU 11a returns to the processing in Act 3. Therefore, in the processing in Act 3 and Act 4, the CPU 11a waits for reception of the link request command and the input of the commodity code.

In the standby state in Act 3 and Act 4, if the commodity code is input (YES in Act 4), CPU 11a registers the commodity sales data (Act 5). In other words, the CPU 11a acquires commodity information such as the commodity name, the unit price and the like set in the commodity database in association with the commodity code. The CPU 11a multiplies the unit price by the sales quantity to calculate the amount corresponding to the sales quantity which is called the sales amount. The sales quantity is a numerical value if the numerical value is input by a numeric keypad or the like before the commodity code is input, and is "1" if no numerical value is input. Thus, the CPU 11a creates the commodity sales data including the commodity code, the commodity name, the unit price, the sales quantity and the sales amount. Then, the CPU 11a registers the commodity sales data in the data buffer 31.

Herein, the registration apparatus 11 constitutes the registration side storage module by the processing in Act 4-Act 5 and the data buffer 31.

If the registration of the commodity sales data is terminated, the CPU 11a updates the display areas D1 and D2 of the registration image SC1 based on the data in the data buffer 31 (Act 6). Thereafter, the CPU 11a returns to the standby state in Act 3 and Act 4. In this standby state, for example, if the subtotal button is input, the input is ignored.

In the standby state in Act 3 and Act 4, if receiving the link request command (YES in Act 3), the CPU 11a stores the device ID of the checkout apparatus 12 contained in the link request command as a transmission source in the link destination ID memory 32 (Act 7). Next, the CPU 11a displays a link destination image SC2 (refer to FIG. 12) (Act 8). The CPU 11a transmits a permission response command to the checkout apparatus 12 which is the command transmission source (Act 9). The permission response command includes the device ID of the registration apparatus 11 as the transmission source. The processing procedures in Act 8 and Act 9 are not limited to those, and the order thereof may be reversed.

As shown in FIG. 12, the link destination image SC2 shows information for guiding the customer 22 to the checkout apparatus 12 which is the link request command transmission source. In FIG. 12, the link destination image SC2 is displayed on the upper right side of the registration image SC1. A display position of the link destination image SC2 is not limited to the position shown in FIG. 12. For example, the link destination image SC2 may be displayed in the center of the registration image SC1. In that case, the link destination image SC2 contains a confirmation button, and the link destination image SC2 is erased if the confirmation button is touched.

If the processing in Act 7 to Act 9 is finished, as shown in FIG. 5, the CPU 11a confirms whether or not the commodity code is input (Act 11). If the commodity code is not input (NO in Act 11), the CPU 11a confirms whether or not a communication command is received from the checkout apparatus 12 in the linked state (Act 12). The communication command is described in the information processing of the checkout apparatus 12 described later. If the communication command is not received (NO in Act 12), the CPU 11a confirms whether or not the subtotal button is input (Act 13). If the subtotal button is not input, the CPU 11a returns to the processing in Act 11. Therefore, in the processing in Act 11 to Act 13, the CPU 11a waits for until the commodity code is input, the communication command is received or the subtotal button is input.

In the standby state in Act 11 to Act 13, If the commodity code is inputted (YES in Act 11), the CPU 11a executes the same processing as the above-mentioned processing in Act 5 and Act 6. In other words, the CPU 11a registers the commodity sales data (Act 14) and updates the display areas D1 and D2 of the registration image SC1 (Act 15). Furthermore, the CPU 11a controls the communication unit 11h so as to transmit the display data including information of the commodity name, the unit price, the sales quantity and the sales amount and the information of the total quantities and the total amount thereof registered in the data buffer 31 to the checkout apparatus 12 in the linked state (Act 16). By this control, the display data addressed to the device ID stored in the link destination ID memory 32 is transmitted to the LAN 13. The display data is received at the checkout apparatus 12 identified by the device ID which is the destination. After controlling the transmission of the display data, the CPU 11a returns to the standby state in Act 11 to Act 13.

In the standby state in Act 11 to Act 13, if the communication command is received (YES in Act 12), the CPU 11a displays a message or an icon in response to the command on the touch panel 11f (Act 17). The detailed description of the processing is made in the information processing by the checkout apparatus 12 described later.

In the standby state in Act 11 to Act 13, if the subtotal button is input (YES in Act 13), the CPU 11a displays a transfer button on the touch panel 11f (Act 18). The transfer button may be displayed as a part of the registration image SC1. Alternatively, the transfer button may be displayed in an area other than the area of the registration image SC1 on the touch panel 11f.

The CPU 11a waits for until the transfer button is input (Act 19). If the transfer button is input (YES in Act 19), the CPU 11a issues a new registration apparatus transaction number (Act 20). The registration apparatus transaction number is, for example, a number obtained by being incremented by one from 1 in order. If the registration apparatus transaction number is issued, the CPU 11a generates the registration transaction data including the registration apparatus transaction number and the commodity sales data in the data buffer 31 (Act 21). The CPU 11a controls the communication unit 11h to send the registration transaction data to the checkout apparatus 12 in the linked state. By this control, the registration transaction data addressed to the device ID stored in the link destination ID memory 32 is transmitted to the LAN 13. The registration transaction data is received by the checkout apparatus 12 identified by the device ID which is the destination.

Herein, the registration apparatus 11 constitutes the output module by the communication unit 11h and the processing in Act 18-Act 21.

After controlling the transmission of the registration transaction data, the CPU 11a stores the registration transaction data in a journal file of the auxiliary storage unit 11d (Act 22). The CPU 11a clears the device ID stored in the link destination ID memory 32 (Act 23). Furthermore, the CPU 11a erases the link destination image SC2 displayed on the touch panel 11f (Act 24). The sequence of the processing in Act 22 to Act 24 is not limited to this. The front and rear may be replaced appropriately.

After the processing in Act 20 to Act 24 is finished, the CPU 11a ends the information processing for one transaction. Then, the CPU 11a starts the processing again from Act 1 in the same way as stated above.

Next, the information processing executed by the checkout apparatus 12 is described with reference to FIG. 6 to FIG. 10. The information processing is executed according to the control program stored in the ROM 12b or the auxiliary storage unit 12d.

Figure 6:
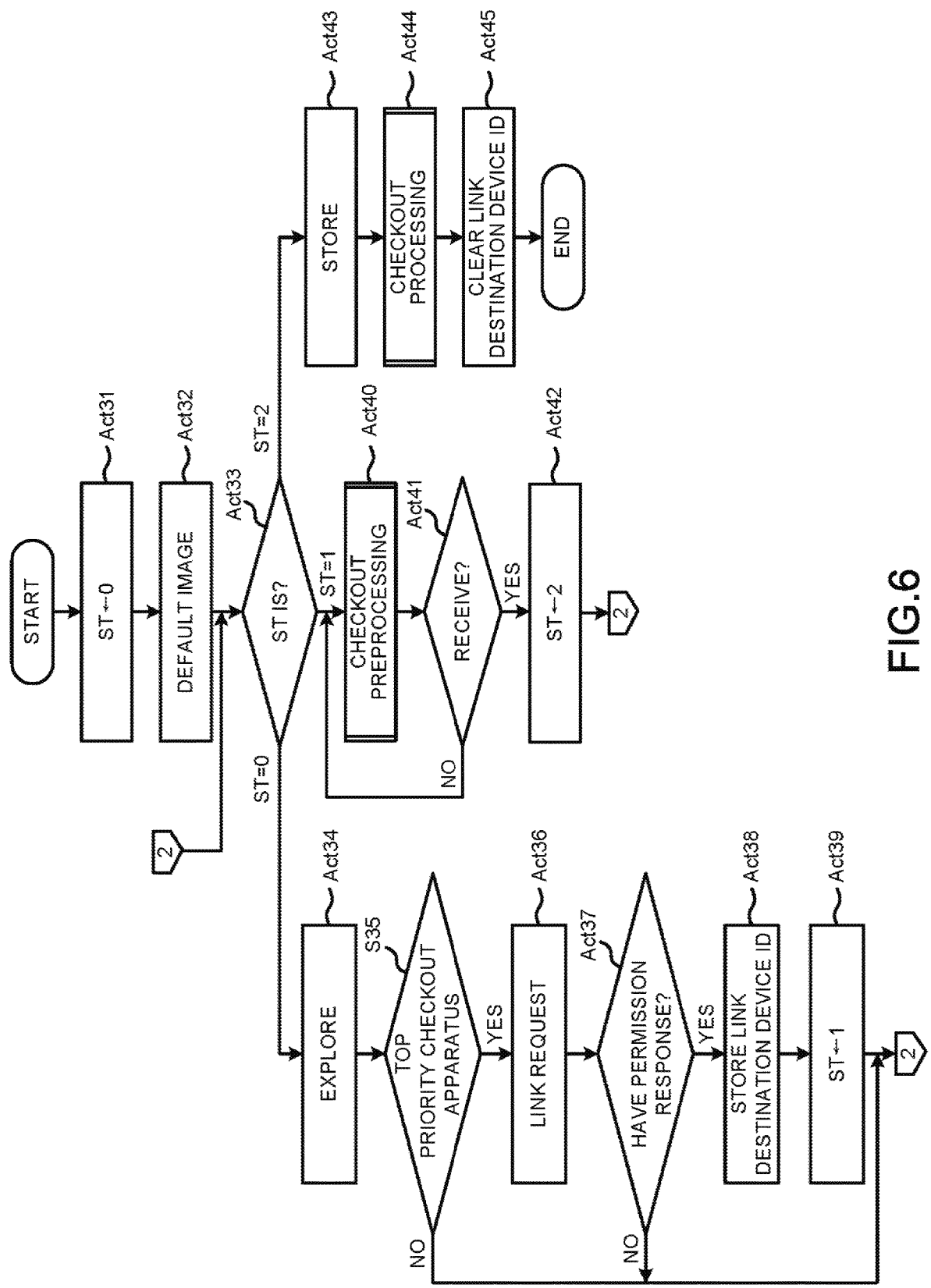
FIG. 6 is a flowchart illustrating an information processing procedure of one transaction executed by a CPU of the checkout apparatus according to a control program.

If the control program is started in the checkout apparatus 12, as shown in FIG. 6, the CPU 12a first sets a device status ST to "0" (Act 31). The CPU 12a displays a default image on a part of the screen of the touch panel 12f (Act 32).

The default image is arbitrary. For example, the default image may be a message "welcome". Alternatively, an advertisement image of a promotion commodity may be displayed.

The device status ST indicates the state of the checkout apparatus 12, and is stored in the auxiliary storage unit 12d, for example. In the present embodiment, the device status ST at the time of not being in the linked state with the registration apparatus 11 is set to "0". The device status ST at the time of being in the linked state with the registration apparatus 11 to be capable of executing the checkout preprocessing is set to "1". The device status ST at the time of receiving the registration transaction data from the registration apparatus in the linked state to be capable of executing the checkout processing is set to "2".

The checkout preprocessing is a processing of receiving preparation for payment by the customer. For example, in the case of the cash payment, the checkout preprocessing refers to a processing of receiving depositing of bills and coins of appropriate amount in the automatic change machine 12m. In the case of the electronic money payment, the checkout preprocessing refers to a processing of receiving the balance inquiry of electronic money or the charge with the electronic money. In the case of the credit card payment, the checkout preprocessing refers to a processing of reading the data of the credit card.

The checkout processing refers to a processing of completing the payment by the customer. For example, in the case of the cash payment, the checkout processing refers to a processing of setting deposited amount inserted into the automatic change machine 12m as the deposit amount, calculating the change amount and dispensing the change from the automatic change machine 12m. In the case of the electronic money payment, the checkout processing refers to a processing of subtracting the payment amount from the balance of the electronic money. In the case of the credit card payment, the checkout processing refers to a processing of authenticating the credit card.

The CPU 12a confirms the device status ST (Act 33). At this time point, since the device status ST is "0", the CPU 12a communicates with other checkout apparatuses 12 via the LAN 13 to explore the checkout apparatus 12 of which the device status ST is set to "0" (Act 34). Then, the CPU 12a refers to the selection table T1 to determine whether or not the checkout apparatus 12 is a top priority checkout apparatus (Act 35). The top priority checkout apparatus refers to the checkout apparatus 12 which is the highest in the priority order among the checkout apparatuses 12 of which the device statuses ST are set to "0" for the registration apparatus 11. In the case in which the checkout apparatus 12 becomes the top priority checkout apparatus for a plurality of the registration apparatuses 11, the checkout apparatus 12 is the top priority checkout apparatus for the registration apparatus 11 with the highest priority order.

A specific example of the processing for determining the top priority checkout apparatus is described using the selection table T1 in FIG. 3. As an example, the device statuses of all the checkout apparatuses 12 are set to "0". In this case, for the registration apparatus 11 with the device ID "R1", the checkout apparatus which is first in the priority order, in other words, the checkout apparatus 12 with the device ID "A2" is the top priority checkout apparatus. For the registration apparatus 11 with the device ID "R2", the checkout apparatus which is first in the priority order, in other words, the checkout apparatus 12 with the device ID "A4" is the top priority checkout apparatus. For the registration apparatus 11 with the device ID "R3", the checkout apparatus which is first in the priority order, in other words, the checkout apparatus 12 with the device ID "A6" is the top priority checkout apparatus. The checkout apparatuses 12 with other device IDs "A1", "A3" and "A5" are not the top priority checkout apparatuses.

As another example, the device status of the checkout apparatus 12 other than the device ID "A2" is set to "0". In this case, for the registration apparatus 11 with the device ID "R1", the checkout apparatus which is second in the priority order, in other words, the checkout apparatus 12 with the device ID "A1" becomes the top priority checkout apparatus.

As yet another example, the device statuses of the checkout apparatuses 12 with the device IDs "A1", "A2" and "A3" are not "0" and the checkout apparatuses 12 with the device IDs "A4", "A5" and "A6" are set to "0". In this case, for the registration apparatus 11 with the device ID "R1", the checkout apparatus which is fourth in the priority order, in other words, the checkout apparatus 12 with the device ID "A4" is the top priority checkout apparatus. However, the checkout apparatus 12 with the device ID "A4" becomes the top priority checkout apparatus which is first in the priority order for the registration apparatus 11 with the device ID "R2". For this reason, for the registration apparatus 11 with the device ID "R1", the checkout apparatus which is fifth in the priority order, in other words, the checkout apparatus 12 with the device ID "A5" becomes the top priority checkout apparatus.

In Act 35, if it is determined that the checkout apparatus 12 is not the top priority checkout apparatus (NO in Act 35), the CPU 12a returns to the processing in Act 33. Therefore, in this case, since the device status ST remains "0", the CPU 12a repeats the processing in Act 34-Act 35.

In Act 35, if it is determined that that the checkout apparatus 12 is the top priority checkout apparatus (YES in Act 35), the CPU 12a controls the communication unit 12h to transmit the link request command to the registration apparatus 11 for which the checkout apparatus 12 becomes the top priority checkout apparatus (Act 36). By this control, the link request command addressed to the corresponding device ID of the registration apparatus 11 is transmitted to the LAN 13. The link request command includes own device ID (checkout apparatus ID) as the transmission source. The link request command is received by the registration apparatus 11 of which the device ID which is the destination is set.

After sending the link request command, the CPU 11a determines whether or not the permission response command is received (Act 37). As described above, if the registration apparatus 11 receives the link request command in the standby state in Act 3 to Act 4, the CPU 11a of the registration apparatus 11 executes the processing in Act 7 to Act 9. In other words, the CPU 11a stores the device ID (checkout apparatus ID) of the transmission source contained in the link request command in the link destination ID memory (Act 7) and displays the link destination image on the touch panel 11f (Act 8). The CPU 11a transmits the permission response command to the checkout apparatus 12 which is the transmission source of the link request command (Act 9). On the other hand, if the registration apparatus 11 does not receive the link request command in the standby state of Act 3. Therefore, the registration apparatus 11 does not transmit the permission response command to the checkout apparatus 12 which is the transmission source of the link request command.

If the permission response command cannot be received for the link request command (NO in ACT 37), the CPU 12a returns to the processing in Act 33. Therefore, in this case, since the device status ST remains "0", the CPU 12a repeats the processing in Act 34-Act 37 in the same way as stated above.

If the permission response command is received for the link request command (YES in ACT 37), the CPU 12a stores the device ID of the registration apparatus 11 contained as the destination in the command in the link destination ID memory 44 (Act 38). The CPU 12a updates the device status ST to "1" (Act 39). Thereafter, the CPU 12a returns to the processing in Act 33.

Herein, the checkout system 10 constitutes the link module according to the processing in Act 7-Act 9 by the registration apparatus 11 and the processing in Act 34-Act 39 by the checkout apparatus 12.

If returning to the processing in Act 33 after the processing in Act 39, since the device status ST is updated to "1", the CPU 12a executes the checkout preprocessing (Act 40).

Figure 7:
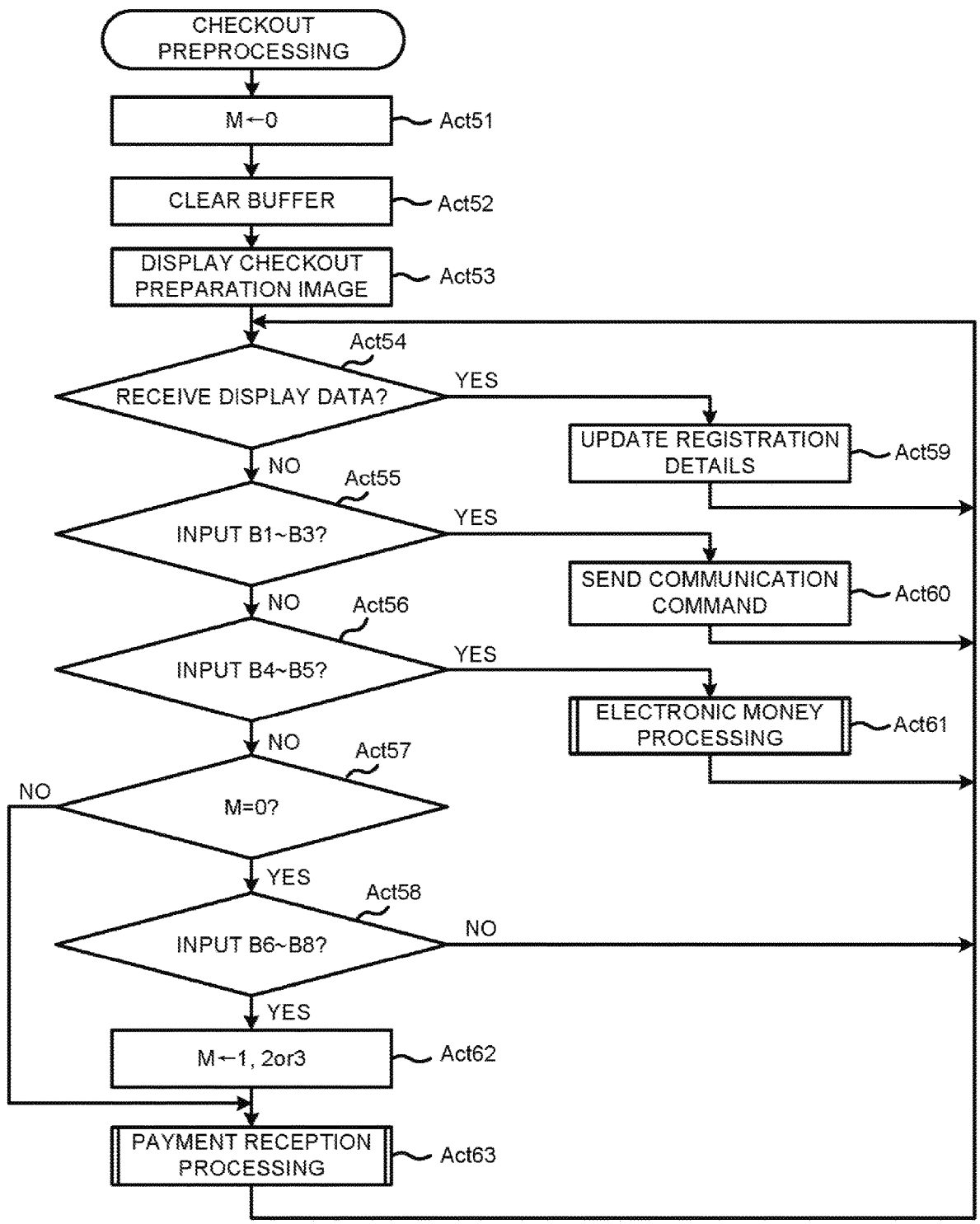
FIG. 7 is a flowchart illustrating detailed procedures of the checkout preprocessing in FIG. 6.

FIG. 7 is a flowchart illustrating the specific procedure of the checkout preprocessing. Upon entering the checkout preprocessing, the CPU 12a sets media data M to "0" (Act 51). The media data M is used for identifying the payment method. In the present embodiment, the media data M for identifying the cash payment is set to "1", the media data M for identifying the electronic money payment is set to "2", and the media data M for identifying the credit card payment is set to "3". "0" indicates a state in which the method of the payment is indeterminate.

The CPU 12a clears the data buffer 41 (Act 52). Then, the CPU 11a displays a checkout preparation image SC3 (refer to FIG. 13) on a part of the screen of the touch panel 12f (Act 53).

The checkout preparation image SC3 supports the customer who prepares for the payment. As shown in FIG. 13, the checkout preparation image SC3 includes display areas D3, D4 and D5. The display area D3 displays guidance to the customer. The display area D4 displays the registration details of the commodity that the customer desires to purchase. The display area D5 includes a communication area D51, an electronic money area D52, a payment selection area D53, and a registration termination area D54.

Three kinds of communication buttons B1, B2, and B3 are displayed in the communication area D51. The communication button B1 is touched if the customer uses a gift certificate for the payment. The communication button B2 is touched if the customer purchases a paid plastic bag. The communication button B3 is touched if the customer wants equipment such as chopsticks or a spoon. Needless to say, the communication buttons B1, B2 and B3 are not limited to the three types shown in FIG. 13.

In the electronic money area D52, two kinds of electronic money buttons B4 and B5 are displayed. The electronic money button B4 is touched if the customer charges with the electronic money. The electronic money button B5 is touched if the customer inquires the balance of the electronic money. Needless to say, the electronic money buttons B4 and B5 are not limited to the two types shown in FIG. 13.

Three types of payment method buttons B6, B7, and B8 are displayed in the payment selection area D53. The payment method button B6 is touched if the customer selects the cash payment. The payment method button B7 is touched if the customer selects the electronic money payment. The payment method button B8 is touched if the customer selects the credit card payment. Needless to say, the payment method buttons B6, B7 and B8 are not limited to the three types shown in FIG. 13.

In the registration termination area D54, information for notifying the customer that the registration transaction data is received from the registration apparatus 11 in which the permission response is made to the link request command, in other words, from the registration apparatus 11 in the linked state is displayed. As the information, for example, a message "please perform payment with the selected payment method" may be displayed. The total quantities or the total amount contained in the registration transaction data may be displayed. The total quantities and the total amount contained in the registration transaction data may be displayed in the registration termination area D54 and the above message may be displayed on the display area D3.

After displaying the checkout preparation image SC3, the CPU 12a confirms whether or not the display data is received from the registration apparatus 11 in the linked state (Act 54). If the display data is not received (NO in Act 54), the CPU 12a confirms whether or not the communication buttons B1, B2 and B3 are input (Act 55). If the communication buttons B1, B2, and B3 are not input (NO in Act 55), the CPU 12a confirms whether or not the electronic money buttons B4 and B5 are input (Act 56). If the electronic money buttons B4 and B5 are not input (NO in Act 56), the CPU 12a examines the media data M (Act 57). If the media data M is "0" (YES in Act 57), the CPU 12a confirms whether or not the payment method buttons B6, B7, and B8 are input (Act 58). If the payment method buttons B6, B7, and B8 are not input (NO in Act 58), the CPU 12a returns to the processing in Act 54. Therefore, if the media data M is "0", in other words, if the payment method is indefinite, the CPU 11a waits for until the display data is received, the communication buttons B1, B2 and B3 are input, the electronic money buttons B4 and B5 are input, or the payment method buttons B6, B7 and B8 are input.

If the display data is received in the standby state in Act 54 to Act 58 (YES in Act 54), the CPU 12a updates a registration details display in the display area D4 (Act 59). The display data includes information of the commodity name, the unit price, the sales quantity and the sales amount and information of the total quantities and the total amount thereof registered in the data buffer 31 in the registration apparatus 11 in the linked state. Based on the received display data, the CPU 12a updates the registration details display in the display area D4. After updating the registration details display in the display area D4, the CPU 12a returns to the standby state in Act 54 to Act 58.

If the communication buttons B1, B2 and B3 are input in the standby state in Act 54 to Act 58, the CPU 12a controls the communication unit 12h to transmit the communication command in response to the type of the input communication buttons B1, B2 and B3 to the registration apparatus 11 in the linked state (Act 60). By this control, the communication command addressed to the device ID stored in the link destination ID memory 44 is transmitted to the LAN 13. The communication command is received by the registration apparatus 11 identified by the device ID which is the destination. As described above, in the registration apparatus 11 receiving the communication command, a message, an icon and the like corresponding to the command are displayed on the touch panel 11f.

For example, if the communication command corresponding to the communication button B1 is received, in the registration apparatus 11, the message, the icon and the like for notifying the store clerk 21 that the customer 22 uses the gift certificate is displayed on the touch panel 11f. After confirming the notification, the store clerk 21 may just go to the customer 22 to receive the gift certificate and register the denomination thereof in the checkout apparatus 12 or the registration apparatus 11.

If the communication command corresponding to the communication button B2 is received, in the registration apparatus 11, the message, the icon and the like for notifying the store clerk 21 that the customer 22 uses the paid plastic bag is displayed on the touch panel 11f. The store clerk 21 after confirming the notification may just register the paid plastic bag in the registration apparatus 11 and put the plastic bag into the shopping basket 16 into which the purchase target commodity is input.

If the communication command corresponding to the communication button B3 is received, in the registration apparatus 11, the message, the icon and the like for notifying the store clerk 21 that the customer 22 wants the equipment such as chopsticks or the spoon is displayed on the touch panel 11f. The store clerk 21 after confirming the notification may just pass the necessary equipment from the purchase target commodity to the customer 22.

After controlling the transmission of the communication command, the CPU 12a returns to the standby state in Act 54 to Act 58.

In the standby state in Act 54 to Act 58, if the electronic money buttons B4 and B5 are inputted, the CPU 12a executes the electronic money processing (Act 61).

Figure 8:
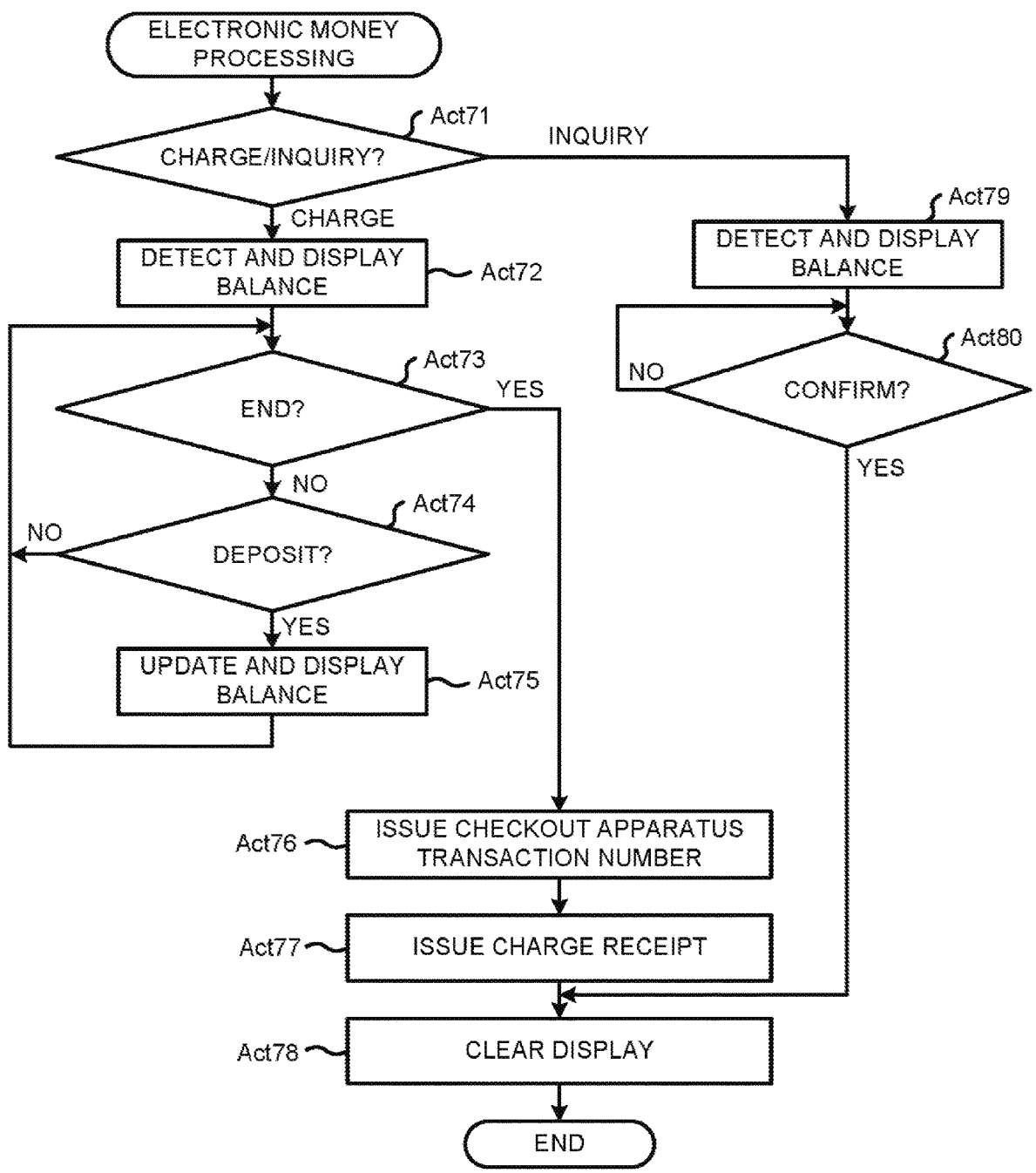
FIG. 8 is a flowchart illustrating detailed procedures of an electronic money processing in FIG. 7.

FIG. 8 is a flowchart illustrating the specific procedure of the electronic money processing. Upon entering the electronic money processing, the CPU 12a confirms which one of the electronic money buttons B4 and B5 is input (Act 71).

If the electronic money button B4 is input ("charge" in Act 71), the CPU 12a detects the balance of the electronic money from the data of the electronic money medium read by the electronic money reader/writer 12k and displays it on the touch panel 12f (Act 72). At this time, the touch panel 12f displays a termination button for the customer 22 to instruct the termination of charge together with the balance of the electronic money.

The CPU 12a confirms whether or not the termination button is input (Act 73). If the termination button is not inputted, the CPU 12a confirms whether or not the charged amount is deposited in the automatic change machine 12m (Act 74). If the charged amount is not deposited, the CPU 12a returns to the processing in Act 73. Therefore, in the processing in Act 73 and Act 74, the CPU 12a waits for until the termination button is input or the charged amount is deposited.

In the standby state in Act 73 and Act 74, if the charged amount is deposited, the CPU 12a updates the balance of the electronic money medium by increasing the balance of the electronic money with the deposited amount (Act 75). The CPU 12a displays the updated balance on the touch panel 12f. Thereafter, the CPU 12a returns to the standby state in Act 73 and Act 74.

In the standby state in Act 73 and Act 74, if the termination button is input, the CPU 12a issues a new checkout apparatus transaction number (Act 76). The checkout apparatus transaction number is, for example, a number incremented by one from 1 in order. If the checkout apparatus transaction number is issued, the CPU 12a controls the printer 12g to issue a charge receipt (Act 77). Through the control, the charge receipt on which the balance before the charge, the charge amount, the balance after the charge and the checkout apparatus transaction number are printed is issued.

After controlling the issuance of the charge receipt, the CPU 12a deletes the balance displayed on the touch panel 12f (Act 78). As stated above, the electronic money processing is terminated if the electronic money button B4 is input.

On the other hand, if the electronic money button B5 is input ("inquiry" in Act 71), the CPU 12a detects the balance of the electronic money from the data of the electronic money medium read by the electronic money reader/writer 12k and displays it on the touch panel 12f (Act 79). At this time, a confirmation button for instructing that the customer 22 confirms the balance is displayed on the touch panel 12f together with the balance of the electronic money.

The CPU 12a waits for until the confirmation button is input (Act 80). If the confirmation button is input (YES in Act 80), the CPU 12a deletes the balance displayed on the touch panel 12f (Act 78). As stated above, the electronic money processing is terminated in the case in which the electronic money button B5 is input. If the electronic money processing is terminated, the CPU 12a returns to the standby state in Act 54 to Act 58.

In the case where the payment method buttons B6, B7 and B8 are input in the standby state in Act 54 to Act 58 (YES in Act 58), the CPU 12a changes the media data M (Act 62). In other words, if the payment method button B6 is inputted, the CPU 12a changes the media data M to "1", if the payment method button B7 is input, the CPU 12a changes the media data M to "2", and if the payment method button B8 is input, the CPU 12a changes the media data M to "3". Thereafter, the CPU 12a executes the payment reception processing (Act 63).

Figure 9:
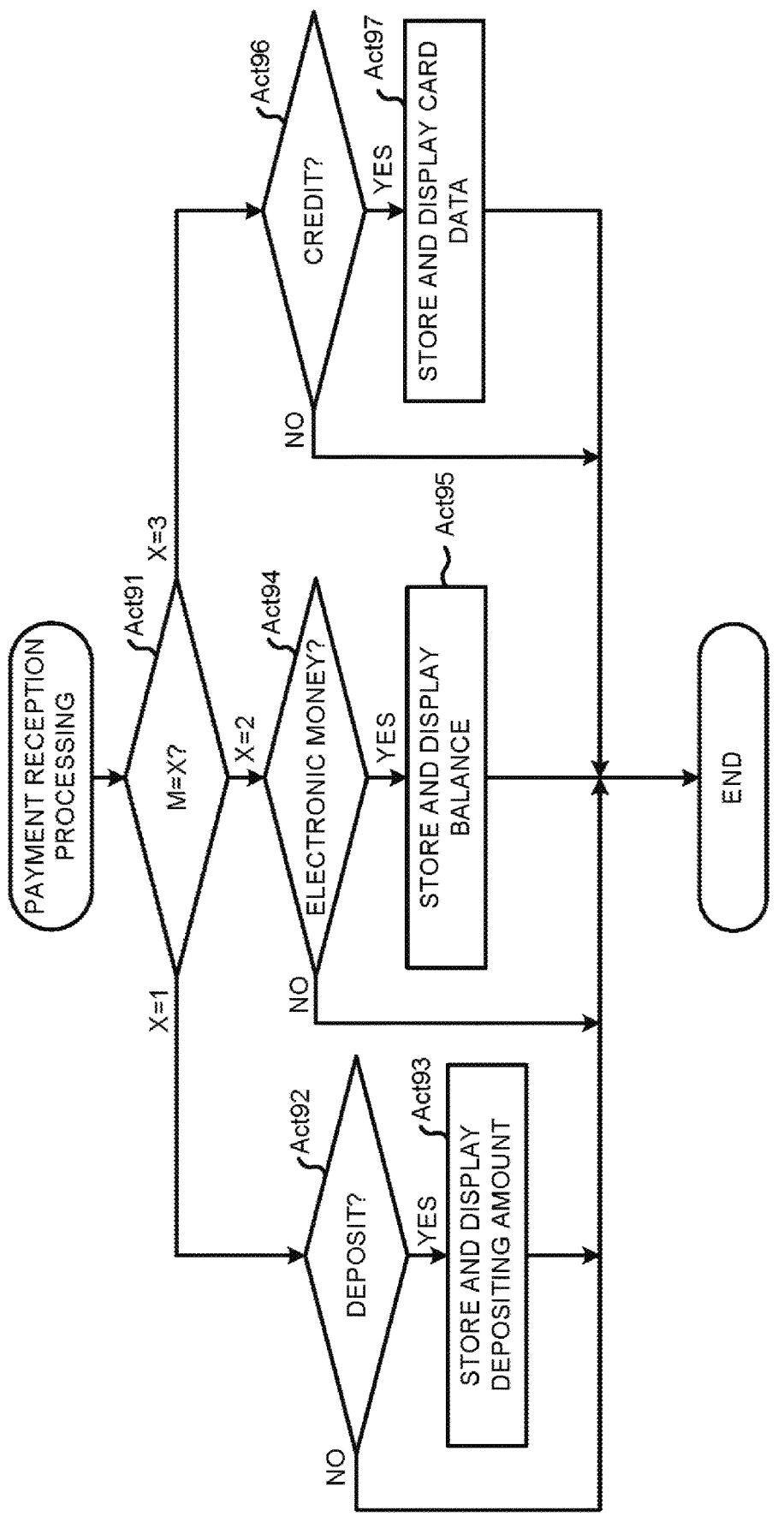
FIG. 9 is a flowchart illustrating detailed procedures of a payment reception processing in FIG. 7.

FIG. 9 is a flowchart illustrating the specific procedure of the payment reception processing. Upon entering the payment reception processing, the CPU 12a examines the media data M (Act 91).

If the media data M is "1", the CPU 12a confirms the presence or absence of the depositing (Act 92). If the cash is not inserted into the automatic change machine 12m (NO in Act 92), the CPU 12a terminates the payment reception processing. If the cash is inserted into the automatic change machine 12m (YES in Act 92), the CPU 12a stores the deposited amount in the data buffer 41 and displays a message indicating that the cash payment is selected on the touch panel 12f (Act 93). As stated above, the CPU 12a terminates the payment reception processing.

If the media data M is "2", the CPU 12a confirms whether or not the data of the electronic money medium is read by the electronic money reader/writer 12k (Act 94). If the data of the electronic money medium is not read (NO in Act 94), the CPU 12a terminates the payment reception processing. If the data of the electronic money medium is read (YES in Act 94), the CPU 12a detects the balance of the electronic money from the data of the electronic money medium read by the electronic money reader/writer 12k (Act 95). Then, the CPU 12a stores the balance in the data buffer 41 and displays a message indicating that the electronic money payment is selected on the touch panel 12f. As stated above, the CPU 12a terminates the payment reception processing.

If the media data M is "3", the CPU 12a confirms whether or not the card reader/writer 12j reads the data of the credit card (Act 96). If the data of the credit card is not read (NO in Act 96), the CPU 12a terminates the payment reception processing. If the data of the credit card is read (YES in Act 96), the CPU 12a stores the data of the credit card read by the card reader/writer 12j in the data buffer 41 and displays a message indicating that the credit card payment is selected on the touch panel 12f (Act 97). Thus, the CPU 12a terminates the payment reception processing.

Herein, the checkout apparatus 12 constitutes the payment reception module by the processing in Act 58, Act 62-Act 63 (Act 91-Act 97) by the checkout apparatus 12.

If the payment reception processing is terminated, the CPU 12a returns to the processing in Act 54. Therefore, since the media data M is not "0" this time (NO in Act 57), the CPU 12a proceeds to NO in Act 57. In other words, the CPU 12a waits for reception of the display data, input of the communication buttons B1, B2 and B3 or input of the electronic money buttons B4 and B5. Further, the CPU 12a executes the payment reception processing.

Return to the description in FIG. 6, while executing the checkout preprocessing, the CPU 12a waits for the registration transaction data transmitted from the registration apparatus 11 (Act 41). If receiving the registration transaction data (YES in ACT 41), the CPU 12a updates the device status ST to "2" (Act 42). Thereafter, the CPU 12a returns to the processing in Act 33. Therefore, in this case, since the device status ST is updated to "2", the CPU 12a stores the registration transaction data in the transaction buffer 42 (Act 43).

Herein, the checkout apparatus 12 constitutes the checkout storage module by the data buffer 41 and the processing in Act 43.

After storing the registration transaction data in the transaction buffer 42, the CPU 12a executes the checkout processing (Act 44).

Figure 10:
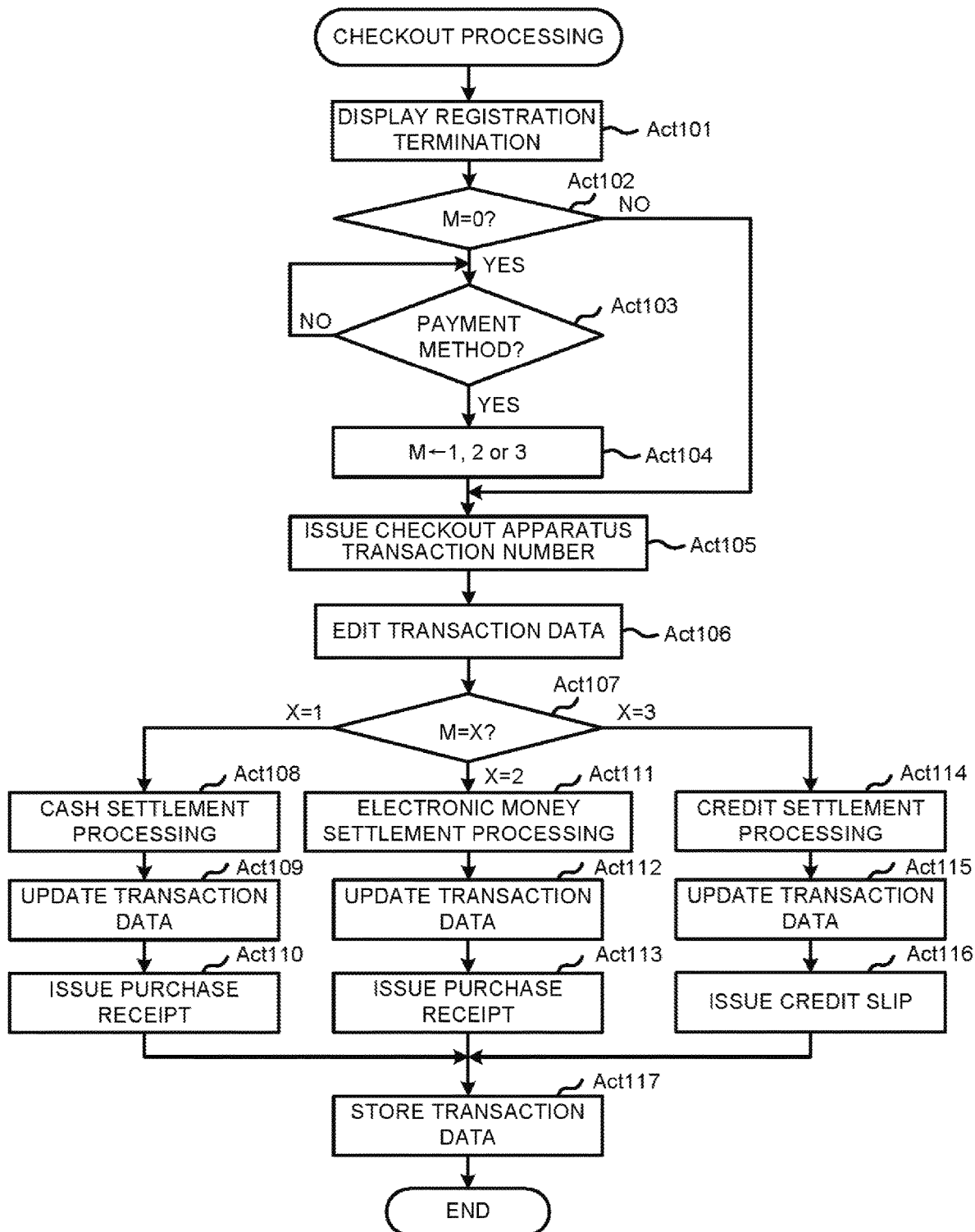
FIG. 10 is a flowchart illustrating detailed procedures of a checkout processing in FIG. 6.

FIG. 10 is a flowchart illustrating the specific procedure of the checkout processing. Upon entering the checkout processing, the CPU 12a displays information for informing the customer that the registration transaction data is received as stated above on the registration termination area D54 of the checkout preparation image SC3 (Act 101).

Next, The CPU 12a examines the media data M (Act 102). If the media data M is "0" (YES in Act 102), the payment method is indefinite. In this case, the CPU 12a waits for input of payment method buttons B6, B7 and B8 (Act 103). If the payment method buttons B6, B7 and B8 are input (YES in Act 103), the CPU 12a changes the media data M (Act 104). In other words, if the payment method button B6 is inputted, the CPU 12a changes the media data M to "1", if the payment method button B7 is input, the CPU 12a changes the media data M to "2", and if the payment method button B8 is input, the CPU 12a changes the media data M to "3". Therefore, it is possible for the customer 22 to select the payment method not only before the checkout apparatus 12 receives the registration transaction data but also after the checkout apparatus 12 receives the registration transaction data.

If the media data M is changed in Act 104, or the media data M is not set to "0" in Act 102 (NO in Act 102), the CPU 12a issues the new checkout apparatus transaction number (Act 105). If the checkout apparatus transaction number is issued, the CPU 12a edits the transaction data (Act 106). Specifically, the CPU 12a adds the payment transaction data stored in the data buffer 41 together with the checkout apparatus transaction number to the registration transaction data stored in the transaction buffer 42, and generates the transaction data indicating the content of one transaction.

Herein, the checkout apparatus 12 constitutes the generation module by the transaction buffer 42 and the processing in Act 106 and Act 109.

Next, the CPU 12a examines the media data M (Act 107). Herein, if the media data M is "1", the CPU 12a executes the cash settlement processing (Act 108). In other words, the CPU 12a calculates the change amount if the deposit amount inserted into the automatic change machine 12m becomes equal to or more than the total amount. At this time, if the deposited amount is stored in the payment reception processing, the deposited amount is the deposit amount. In addition, if the cash is further inserted into the automatic change machine 12m, the input amount is added to the deposited amount to become the deposit amount. Therefore, the customer can take a countermeasure, for example, inserting the bills for approximate payment at the stage of the checkout preprocessing and inserting the coins corresponding to the payment determined at the stage of the checkout processing.

If the cash settlement processing is terminated, the CPU 12a updates the transaction data of the transaction buffer 42 (Act 109). Specifically, the CPU 12a adds the deposit amount and the change amount to the transaction data. Then, the CPU 12a creates print data of a purchase receipt based on the data of the transaction buffer 42, and outputs it to the printer 12g to control issuance of the purchase receipt (Act 110).

In Act 107, if the media data M is "2", the CPU 12a executes the electronic money settlement processing (Act 111). In other words, the CPU 12a subtracts the total amount from the balance of the electronic money obtained from the data read from the electronic money medium by the electronic money reader/writer 12k. At this time, if the electronic money balance is already stored in the payment reception processing, the electronic money balance is used.

If the electronic money settlement processing is terminated, the CPU 12a updates the transaction data of the transaction buffer 42 (Act 112). Specifically, the balance of the electronic money before the payment and the balance of the electronic money after the payment are added to the transaction data. Then, the CPU 12a creates the print data of the purchase receipt based on the data of the transaction buffer 42, and outputs it to the printer 12g to control the issuance of the purchase receipt (Act 113).

Herein, the checkout apparatus 12 constitutes the issuance module by the printer 12g and the processing in Act 110 or Act 113.

In Act 107, if the media data M is "3", the CPU 12a executes the credit card settlement processing (Act 114). In other words, the CPU 12a authenticates the data read from the credit card with the card reader/writer 12j. At this time, if the data of the credit card is stored in the payment reception processing, the data is authenticated.

If the data of the credit card is authenticated and the credit card settlement processing is terminated, the CPU 12a updates the transaction data of the transaction buffer 42 (Act 115). Specifically, the payment amount by the credit card and the information of a part of the credit card and the like are added to the transaction data. Then, the CPU 12a creates print data of a credit slip based on the data in the transaction buffer 42, and outputs it to the printer 12g to control the issuance of the credit slip (Act 115).

In this way, if the purchase receipt is issued (Act 110, Act 113), or the credit slip is issued (Act 116), the CPU 12a stores the transaction data in the transaction buffer 42 in the auxiliary storage unit 12d (Act 117). Thus, the CPU 12a terminates the checkout processing.

Return to the description of FIG. 6, if the checkout processing is terminated, the CPU 12a clears the device ID stored in the link destination ID memory 32 (Act 45).

The checkout system 10 constitutes a release method according to the processing in Act 23 by the registration apparatus 11 and the processing in Act 45 by the checkout apparatus 12. In this way, the CPU 12a terminates the information processing for one transaction. Then, the CPU 12a starts the processing again from the processing Act 31 in the same as stated above.

Next, the operation and effect of the checkout system 10 are described by taking the checkout lane in which the registration apparatus 11 (hereinafter, referred to as a registration apparatus 11-R1) with the device ID "R1" is installed as an example.

In FIG. 1, the registration job of the purchase target commodity by the customer 22 who is present at the installation position of the checkout apparatus 12 (hereinafter, referred to as a checkout apparatus 12-A2) with the device ID "A2" is terminated with the registration apparatus 11-R1. The device status ST of the checkout apparatus 12-A2 is "2". On the other hand, it is assumed that the checkout apparatus 12 (hereinafter, referred to as a checkout apparatus 12-A1) with the device ID "A1" is in an idle state. In this case, for the registration apparatus 11-R1, the checkout apparatus 12-A1 is the top priority checkout apparatus. Therefore, the link request command is transmitted from the checkout apparatus 12-A1 to the registration apparatus 11-R1. If the registration apparatus 11-R1 and the checkout apparatus 12-A1 are in the linked state, the link destination image SC2 for guiding the customer 22 to the checkout apparatus 12-A1 is displayed on the touch panel 11f of the registration apparatus 11-R1. On the touch panel 12f of the checkout apparatus 12-A1, the checkout preparation image SC3 is displayed.

Herein, if the next customer 22 arrives at the checkout lane, the store clerk 21 gives a guidance to guide the customer 22 to the checkout apparatus 12-A1 represented by the link destination image SC2. The method of the guidance is not particularly limited. Generally speaking, it is thought that the guidance such as "please go to the checkout apparatus of A1 and prepare for payment" is made orally. The customer 22 who hears the guidance moves to the installation position of the checkout apparatus 12-A1.

The store clerk 21 who is the operator of the registration apparatus 11-R1 starts the registration of the purchase target commodity for the customer 22 who moves to the installation position of the checkout apparatus 12-A1. Then, in the registration apparatus 11-R1, the data of the purchase target commodity is stored in the data buffer 31. In the checkout apparatus 12-A1, the data stored in the data buffer 31, in other words, the details (commodity name, the unit price, the sales quantity and the sales amount) of the purchase target commodity are displayed in the display area D4 of the checkout preparation screen SC3. Accordingly, the customer 22 who moves to the installation position of the checkout apparatus 12-A1 can confirm the registration content in the registration apparatus 11-R1 in real time from the contents of the display area D4. In this way, since it can be confirmed that the purchase target commodity is registered correctly by the store clerk 21 even if the customer leaves the vicinity of the store clerk 21, the customer 22 can move to the installation position of the checkout apparatus 12-A1 at ease.

On the other hand, the customer 22 who moves to the installation position of the checkout apparatus 12-A1 and confirms the checkout preparation image SC3, notifies the store clerk 21 who operates the registration apparatus 11-R1 of the use of the gift certificate by touching the communication button B1. Similarly, by touching the communication button B2, it is possible to notify the use of the paid plastic bag, and by touching the communication button B3, it is possible to notify the request of the equipment such as the chopsticks or a spoon. In this way, even if the customer moves to the installation position of the checkout apparatus 12-A1, the customer 22 can communicate with the store clerk 21 who operates the registration apparatus 11-R1. Therefore, the customer 22 can move to the installation position of the checkout apparatus 12 according to the instruction of the store clerk 21 at ease even before the registration of the purchase target commodity is terminated.

The customer 22 confirming the checkout preparation image SC3 touches the electronic money button B4 holds the electronic money medium over the electronic money reader/writer 12k and inserts the charged amount into the automatic change machine 12m to charge with the electronic money. Similarly, by touching the electronic money button B5 and holding the electronic money medium over the electronic money reader/writer 12k, the customer 22 can inquire the balance of the electronic money. In this way, while the checkout preparation image SC3 is being displayed, in other words, while the registration of the purchase target commodity is being executed at the registration apparatus 11-R1, the customer 22 operates the checkout apparatus 12-A1 to be capable of executing the charge with the electronic money or inquiry of the balance.

Similarly, the customer 22 who already confirms the checkout preparation image SC3 can prepare for the cash payment by touching the payment method button B6. Specifically, it is possible to input the cash required for the payment in advance to the automatic change machine 12m. By touching the payment method button B7, the customer 22 can prepare for the electronic money payment and by touching the payment method button B8, the customer 22 can prepare for the credit card payment.

Therefore, the customer 22 can start preparing for the cash payment at the installation position of the checkout apparatus 12-A1 without waiting for the termination of the data input of the purchase target commodity. Then, for example, if the customer 22 touches the payment method button B6 and inserts the cash into the automatic change machine 12m, the deposited amount is stored in the data buffer 41. Thereafter, if the registration of the purchase target commodity of the customer 22 who moves to the installation position of the checkout apparatus 12-A1 is terminated and the operator of the registration apparatus 11-R1 touches the subtotal button, the checkout apparatus 12-A1 generates the transaction data representing the content of one transaction from the data stored in the data buffer 31 of the registration apparatus 11-R1 and the data stored in the checkout apparatus 12-A1. The receipt is issued based on the transaction data.

As described above, in the checkout system 10, since transaction data is created in accordance with the data stored in the data buffers 31 and 41 at the same time in the registration apparatus 11-R1 and the checkout apparatus 12-A1, even if the operation relating to the payment is performed in the checkout apparatus 12-A1 before the end of the registration of the transaction data, the content thereof can be reflected in the transaction data and correct transaction data can be generated. As a result, the staying time of the customer 22 at the installation position of the checkout apparatus 12-A1 is shortened, so that the checkout job can be more efficient.

Hereinafter, other embodiments are described.

In the above embodiment, the checkout apparatus 12 having the device status ST of "0" determines whether or not the checkout apparatus 12 is the top priority checkout apparatus for the registration apparatus 11 using the selection table T1. In the case in which the checkout apparatus 12 is the top priority checkout apparatus, the checkout apparatus 12 transmits the link request command to the registration apparatus 11. Upon receiving of the permission response command from the registration apparatus 11, the checkout system 10 sets the checkout apparatus 12 and the registration apparatus 11 to the linked state.

Figure 14:
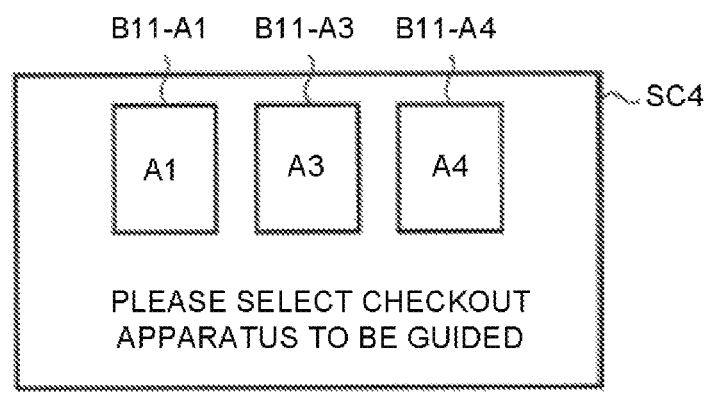
FIG. 14 is a diagram illustrating an example of a checkout apparatus selection image displayed on the touch panel of the registration apparatus.

In another embodiment, the checkout apparatus 12 having the device status ST of "0" transmits the link request command to the registration apparatus 11. The registration apparatus 11 that is not in the linked state with the checkout apparatus 12 displays a checkout apparatus selection screen SC4 (refer to FIG. 14) capable of selecting the device ID of the checkout apparatus 12 which transmits the link request command on the touch panel 11f.

The checkout apparatus selection image SC4 includes buttons B11-A1, B11-A3 and B11-A4 corresponding to the device IDs of the checkout apparatuses 12 having the device status ST of "0" one to one. The checkout apparatus selection image SC4 is displayed at the center of the registration image SC1, for example. The store clerk 21 who confirms the image SC1 touches any one of the buttons B11. Then, the permission response command is transmitted from the registration apparatus 11 to the checkout apparatus 12 with the device ID corresponding to the button B11. Thus, the checkout system 10 sets the checkout apparatus 12 and the registration apparatus 11 to the linked state.

Figure 15:
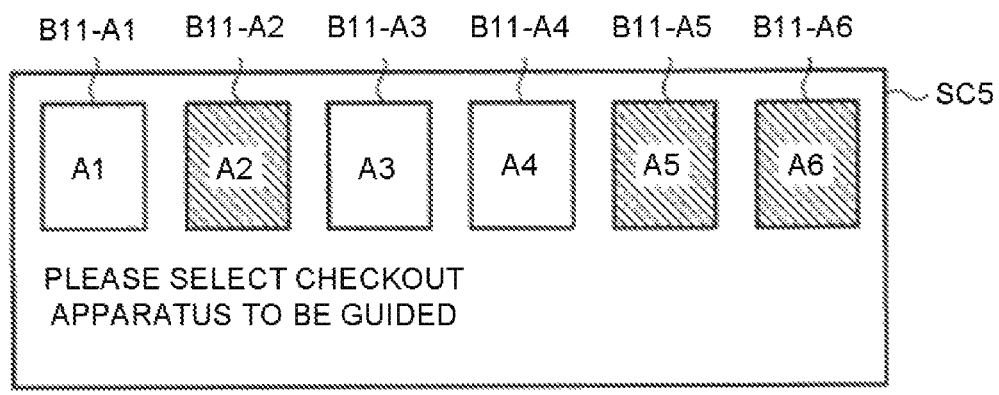
FIG. 15 is a diagram illustrating another example of the checkout apparatus selection image displayed on the touch panel of the registration apparatus.

In this case, as shown in FIG. 15, on a checkout apparatus selection image SC5, the buttons B11-A1, B11-A2, B11-A3, B11-A4 and B11-A5 corresponding to the device IDs of all the checkout apparatuses 12 one to one. Then, only the button corresponding to the device ID of the checkout apparatus 12 whose the device status ST is "0" may be displayed in a state in which the input is enabled.

In the above embodiment, the registration termination area D54 is a part of the display area D5. In another embodiment, on condition that the payment method is selected at the stage of the checkout preprocessing, if the registration transaction data is received from the registration apparatus 11 in the linked state, the whole of the display area D5 is set as the registration termination area and buttons B1~B8 is erased. In this way, the customer 22 can be definitely aware of termination of the registration of the purchase target commodity at the registration apparatus 11.

In this case, if the payment method is not selected at the stage of the checkout preprocessing, the communication area D51 and the electronic money area D52 may be set as the registration termination area, and the buttons B6~B8 of the payment selection area D53 may receive the input.

In the above embodiment, the registration transaction data based on the input commodity data from the registration apparatus 11 is transferred to the checkout apparatus 12.

In another embodiment, the registration transaction data based on the input commodity data is stored in a server on the LAN 13. Then, the registration transaction data stored in the server is transferred from the server to the checkout apparatus 12, and the settlement processing is executed based on the payment data inputted in the checkout apparatus 12. Alternatively, based on the registration transaction data stored in the server and the payment data input in the checkout apparatus 12 linked with the registration apparatus 11, the server executes the settlement processing. Then, if there is the change, the change is dispensed with the checkout apparatus 12 and the receipt is issued with the checkout apparatus 12.

The transfer of the registration apparatus 11 and the checkout apparatus 12 is generally made in a state in which the program such as the control program is stored in the ROM. However, the present invention is not limited to that, and the control program transferred separate from a computer device is written in a rewritable storage device provided in the computer device in response to an operation by the user, for example. The transfer of the control program can be performed by recording the control program in a removable recording medium or through communication via the network. The recording medium may be in any form as long as it can store a program and can be read by the device such as a CD-ROM, a memory card and the like. The function obtained by installing or downloading the program may be realized in cooperation with an OS (operating system) or the like inside the apparatus.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An in-store transaction network, comprising:
    a local area network;
    a registration apparatus connected to the local area network, the registration apparatus for inputting data of a commodity purchased by a customer; and
    a checkout apparatus connected to the local area network, the checkout apparatus for processing payment of the commodity based on the data input at the registration apparatus,
    the registration apparatus comprising:
    a first processor that executes instructions to:
    store first input data; and
    output the first input data; and
    the checkout apparatus comprising:
    a second processor that executes instructions to:
    receive a second input relating to payment for the commodity before data input of all the commodities purchased by the customer at the registration apparatus is terminated;
    store the second data;
    generate transaction data indicating a content of one transaction based on the second data and the first data; and
    issue a receipt of the one transaction based on the transaction data,
    wherein the checkout apparatus is assigned, by the registration apparatus, a unique device identifier, wherein the unique device identifier is determined based on a descending priority order, and wherein the descending priority order is determined based on a distance value that is measured between the checkout apparatus and the registration apparatus.

2. The in-store transaction network according to claim 1, wherein the second processor further executes instructions to:
    receive at least depositing of cash,
    store a deposited amount, and
    generate the transaction data by setting the deposited amount as a deposit amount.

3. The in-store transaction network according to claim 1, wherein the second processor further executes instructions to:
    receive at least a balance of electronic money,
    store the balance of the electronic money, and
    generate the transaction data by setting a total amount as a payment amount paid by the electronic money at the time the balance of the electronic money is equal to or more than the total amount.

4. The in-store transaction network according to claim 1, wherein the second processor further executes instructions to:
    receive credit card data representative of a credit card,
    store the credit card data, and
    generate the transaction data by setting at least a part of the total amount determined based on the first data as payment amount paid by the credit card in response to receiving an approval of the credit card.

5. The in-store transaction network according to claim 1, further comprising:
    a plurality of checkout apparatuses,
    wherein each of the checkout apparatuses comprise a processor the executes respective instructions to: set the first processor to be capable of executing data communication with any one of the plurality of the checkout apparatuses before the first input data associated with the commodity purchased by the customer is started or during a period from a start to a termination of the first input data, and
    the first processor further executes instructions to output the first input data to the checkout apparatus in a state in which the data communication is possible.

6. The in-store transaction network according to claim 5, wherein each registration apparatus comprises a ROM (Read Only Memory), a RAM (Random Access Memory), an auxiliary storage device, a scanner, a touch panel, a printer, and a transmission system.

7. The in-store transaction network according to claim 1, wherein the registration apparatus comprises a ROM (Read Only Memory), a RAM (Random Access Memory), an auxiliary storage device, a scanner, a touch panel, a printer, and a transmission system.

8. The in-store transaction network according to claim 7, wherein the scanner is configured to read a barcode attached to the commodity.

9. The in-store transaction network according to claim 1, wherein the checkout apparatus comprises a ROM (Read Only Memory), a RAM (Random Access Memory), an auxiliary storage device, a scanner, the touch panel, a printer, a card reader/writer, an electronic money reader/writer, an automatic change machine, and a transmission system.

\* \* \* \* \*